US012572926B2

(12) United States Patent
    Dashkov

(10) Patent No.:    US 12,572,926 B2
(45) Date of Patent:      Mar. 10, 2026

(54) SYSTEMS AND METHODS FOR CREATING AND USING SUSTAINABILITY TOKENS

(71) Applicant: PUMA SE, Herzogenaurach (DE)

(72) Inventor: Ivan Dashkov, Boston, MA (US)

(73) Assignee: PUMA SE, Herzogenaurach (DE)

( * ) Notice: Subject to any disclaimer, the term of this patent is extended or adjusted under 35 U.S.C. 154(b) by 92 days.

(21) Appl. No.: 18/529,522

(22) Filed: Dec. 5, 2023

(65) Prior Publication Data

US 2024/0185229 A1      Jun. 6, 2024

Related U.S. Application Data

(60) Provisional application No. 63/430,454, filed on Dec. 6, 2022.

(51) Int. Cl.
    *G06Q 20/36*          (2012.01)
    *G06Q 10/30*          (2023.01)
(52) U.S. Cl.
    CPC ......... *G06Q 20/3678* (2013.01); *G06Q 10/30* (2013.01)
(58) Field of Classification Search
    CPC . G06Q 20/3678; G06Q 10/30; G06Q 30/0207
    See application file for complete search history.

(56) References Cited

U.S. PATENT DOCUMENTS

| 10,505,726 | B1 | 12/2019 | Andon et al. |
| 11,032,072 | B2 | 6/2021 | Andon et al. |
| 11,113,754 | B2 | 9/2021 | Andon et al. |

(Continued)

FOREIGN PATENT DOCUMENTS

| CA | 3177552 A1 | 9/2022 | |
| WO | WO-2021020721 A1 * | 2/2021 | ............ G06Q 10/04 |

(Continued)

OTHER PUBLICATIONS

"Orchestrating product provenance story: When IOTA ecosystem meets electronics supply chain space", Sabah Suhail, Computers in Industry, vol. 123, Dec. 2020 (Year: 2020).*
PCT International Search Report and Written Opinion, PCT/EP2024/057547, mailed on May 21, 2024, 13 pages.
PCT International Search Report and Written Opinion, PCT/EP2023/084382, mailed on Feb. 6, 2024, 18 pages.

(Continued)

*Primary Examiner* — Duan Zhang
(74) *Attorney, Agent, or Firm* — Quarles & Brady LLP

(57)          ABSTRACT

A method of managing digital assets is provided. The method includes receiving an input identifying a first digital wallet. One or more non-fungible tokens associated with the first digital wallet are identified. From the one or more non-fungible tokens, sustainability tokens are selected, each of the sustainability tokens being associated with a corresponding sustainability digital asset. For each of the sustainability tokens, a uniform resource indicator for the corresponding sustainability digital asset is retrieved from a distributed blockchain ledger and based on the uniform resource indicator, attributes of the corresponding sustainability digital asset are retrieved. A composite sustainability score is generated based on the attributes of the sustainability digital assets associated with the sustainability tokens, which is compared to a first benefit criteria and when the composite sustainability score meets the benefit criteria, a first benefit is provided to an owner of the first digital wallet.

16 Claims, 10 Drawing Sheets

(56)          References Cited

U.S. PATENT DOCUMENTS

| | | | |
|---|---|---|---|
| 11,295,318 | B2 | 4/2022 | Andon et al. |
| 11,308,184 | B2 | 4/2022 | Andon et al. |
| 2010/0100405 | A1* | 4/2010 | Lepore ............... G06Q 30/0601 |
| | | | 705/26.1 |
| 2012/0150552 | A1* | 6/2012 | Belady ................... G06Q 10/30 |
| | | | 705/1.1 |
| 2021/0258155 | A1 | 8/2021 | Andon et al. |
| 2021/0383461 | A1 | 12/2021 | Andon et al. |
| 2022/0058633 | A1 | 2/2022 | Yantis |
| 2022/0172165 | A1* | 6/2022 | Dhakne ................... G06F 30/20 |
| 2022/0188839 | A1 | 6/2022 | Andon et al. |
| 2022/0207119 | A1 | 6/2022 | Andon et al. |
| 2022/0300966 | A1 | 9/2022 | Andon et al. |
| 2022/0351186 | A1 | 11/2022 | Quigley |
| 2022/0358186 | A1 | 11/2022 | Deuel |
| 2022/0383295 | A1 | 12/2022 | Cox |
| 2023/0073859 | A1* | 3/2023 | Matthews .......... G06Q 30/0641 |
| 2024/0062178 | A1* | 2/2024 | McDonnell .......... G06Q 30/018 |

FOREIGN PATENT DOCUMENTS

| | | |
|---|---|---|
| WO | 2022225446 A1 | 10/2022 |
| WO | 2023028023 A1 | 3/2023 |
| WO | 2024121170 A1 | 6/2024 |

OTHER PUBLICATIONS

Das, D., et al. (2022, November). Understanding security Issues in the NFT Ecosystem. In Proceedings of the 2022 ACM SIGSAC conference on computer and communications security (pp. 667-681).

Martinod, N., et al. (2021, August). Towards a secure and trustworthy imaging with non-fungible tokens. In Applications of Digital Image Processing XLIV (vol. 11842, pp. 401-411). SPIE.

Pandey, K. (Mar. 31, 2022). "Can NFTs Be Used to Combat Climate Change?", JumpStart Magazine, accessed at https://www.jumpstartmag.com/can-nfts-be-used-to-combat-climate-change/, 7 pages.

Matthews, L. (2022). "How Some NFTs are Becoming MoreSustainable", LeafScore, accessed on Jul. 27, 2022 at https://www.leafscore.com/blog/how-some-nfts-are-becoming-more-sustainable/, 7 pages.

* cited by examiner

552 — ASSIGN SCORES FOR ATTRIBUTES OF A PRODUCT

554 — TRANSFER PRODUCT TO CONSUMER

556 — DETERMINE TRANSACTION SCORES BASED ON SCORES OF PRODUCTS AND ASPECTS OF TRANSACTION

558 — GENERATE DIGITAL ASSET WITH COMBINED ATTRIBUTES OF TRANSACTION AND PRODUCTS

560 — MINT NFT ASSOCIATED WITH DIGITAL ASSET

562 — TRANSFER NFT TO CONSUMER

900

START

902 — RECEIVE INPUT FOR A CONSUMER DIGITAL WALLET

904 — LIST SUSTAINABILITY NFTS IN WALLET

906 — VALIDATE AUTHENTICITY OF SUSTAINABILITY NFTS IN WALLET

908 — GENERATE COMBINED SCORE FOR ATTRIBUTES OF SUSTAINABILITY NFTS

910 — DOES COMBINED SCORE MEET BENEFIT THRESHOLD?

NO → END

YES

YES

912 — TRANSFER OR BURN NFT(S)

914 — PROVIDE BENEFIT TO CONSUMER

SYSTEMS AND METHODS FOR CREATING AND USING SUSTAINABILITY TOKENS

CROSS REFERENCE TO RELATED APPLICATIONS

This application claims the benefit of and priority to U.S. Provisional Application No. 63/430,454, filed on Dec. 6, 2022, which is incorporated by reference herein in its entirety.

BACKGROUND

Non-fungible tokens can represent products or digital assets with properties that can be integrated into applications and systems connected to a blockchain. Use of these tokens and integration with these systems can provide new methods for providing benefits to customers of a manufacturer or retailer.

Thus, there is a need to provide systems and methods for rewarding and incentivizing environmentally sustainable consumer and corporate behaviors through the use of non-fungible tokens by providing benefits to customers on the basis of their use of non-fungible tokens.

SUMMARY

In accordance with some embodiments of the disclosed subject matter, systems, methods, and media for sustainability systems and methods using cryptographic tokens, e.g., non-fungible tokens, are provided.

In one aspect, a method of managing digital assets is provided. The method includes receiving an input identifying a first digital wallet. One or more non-fungible tokens associated with the first digital wallet are identified. From the one or more non-fungible tokens, one or more sustainability tokens are selected, each of the one or more sustainability tokens being associated with a corresponding sustainability digital asset. For each of the one or more sustainability tokens a uniform resource indicator for the corresponding sustainability digital asset is retrieved from a distributed blockchain ledger and based on the uniform resource indicator, one or more attributes of the corresponding sustainability digital asset are retrieved. A composite sustainability score is generated based on the one or more attributes of the sustainability digital assets associated with the one or more sustainability tokens. The composite sustainability score is compared to a first benefit criteria and when the composite sustainability score meets the benefit criteria, a first benefit is provided to an owner of the first digital wallet.

In some examples, at least a first sustainability token of the one or more sustainability tokens corresponds to a first physical product. In some cases, the first sustainability token is associated with a first transaction, the first transaction including a transfer to a first purchasing party of the first physical product. In some cases, the attributes of the first sustainability token include sustainability attributes of a second physical product transferred to the first purchasing party in the first transaction. In some cases, the attributes of the sustainability digital asset corresponding to the first sustainability token include at least a first sustainability attribute of the first physical product. In some cases, the first sustainability attribute is indicative of a volume of carbon emissions associated with the manufacture and transportation of the first physical product, wherein the composite sustainability score is based at least in part on the first sustainability attribute.

In some examples, the attributes of at least one of the one or more sustainability digital assets include a recycling attribute, the recycling attribute associated with a proportion of recyclable materials of one or more physical products associated with the at least one sustainability digital asset, wherein the composite sustainability score is based at least in part on the recycling attribute. In some cases, the first benefit criteria is a minimum recyclability criteria indicating a minimum proportion of recyclable materials. In some cases, the first benefit is admission to a physical event.

In some cases, the composite sustainability score is based at least in part on the attributes of a second sustainability digital asset corresponding to a second sustainability token, wherein the method further includes recording to the distributed blockchain ledger, responsive to a determination that the composite sustainability score meets the benefit criteria, an updated status of the second sustainability token. In some cases, the updated status of the second sustainability token includes a transfer of the second sustainability token. In some examples, the updated status includes a permanent removal of the second sustainability token from the distributed blockchain ledger.

In some examples, the method further comprises updating an attribute of a sustainability digital asset corresponding to at least one of the one or more sustainability tokens, responsive to a determination that the composite sustainability score meets the benefit criteria. In some cases, the method further comprises generating a second composite sustainability score based on the one or more attributes of the sustainability digital assets associated with the one or more sustainability tokens. In some cases, the second composite sustainability score is compared to a second benefit criteria. In some examples, when the second composite sustainability score meets the second benefit criteria, a second benefit is provided to an owner of the first digital wallet. In some examples, the one or more attributes include a first sustainability attribute and a second sustainability attribute, wherein the composite sustainability score is at least partially based on each of the first sustainability attribute and the second sustainability attribute.

In another aspect, a system comprises a computer including a at least one processor. The at least one processor is configured to receive an input identifying a first digital wallet, identify one or more non-fungible tokens associated with the first digital wallet, select, from the one or more non-fungible tokens, one or more sustainability tokens, each of the one or more sustainability tokens being associated with a corresponding sustainability digital asset. For each of the one or more sustainability tokens, the processor is configured to retrieve, from a distributed blockchain ledger, a uniform resource indicator for the corresponding sustainability digital asset, and retrieve, based on the uniform resource indicator, one or more attributes of the corresponding sustainability digital asset. The processor is further configured to generate a composite sustainability score based on the one or more attributes of the sustainability digital assets associated with the one or more sustainability tokens, compare the composite sustainability score to a first benefit criteria, and when the composite sustainability score meets the benefit criteria, provide, to a subject associated with the first digital wallet, an entitlement to a first benefit.

In some examples, the entitlement includes a digital ticket. In some cases, the processor is further configured to output, to a display, the digital ticket. In some cases, providing the entitlement to the first benefit to the subject associated with the first digital wallet includes generating a digital asset corresponding to the entitlement, transmitting, to a server associated with a distributed blockchain ledger, an instruction to generate a token corresponding to the digital asset, and transmitting, to the server an instruction to transfer the token to the first digital wallet.

In yet another aspect, a method is provided of generating non-fungible tokens associated with consumer transactions. The method includes retrieving, from a first blockchain, one or more tokens associated with a first product. A plurality of first product sustainability attributes are determined from digital assets associated with the one or more tokens. The first product is transferred to a first purchasing party in a first transaction. Transaction sustainability attributes are determined for the first transaction, the transaction sustainability attributes being based in part on the first product sustainability attributes. A transaction digital asset is generated, the transaction digital asset including the transaction sustainability attributes. A first sustainability non-fungible token associated with the transaction digital asset is minted to a second blockchain. The first sustainability non-fungible token is transferred to the first purchasing party.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
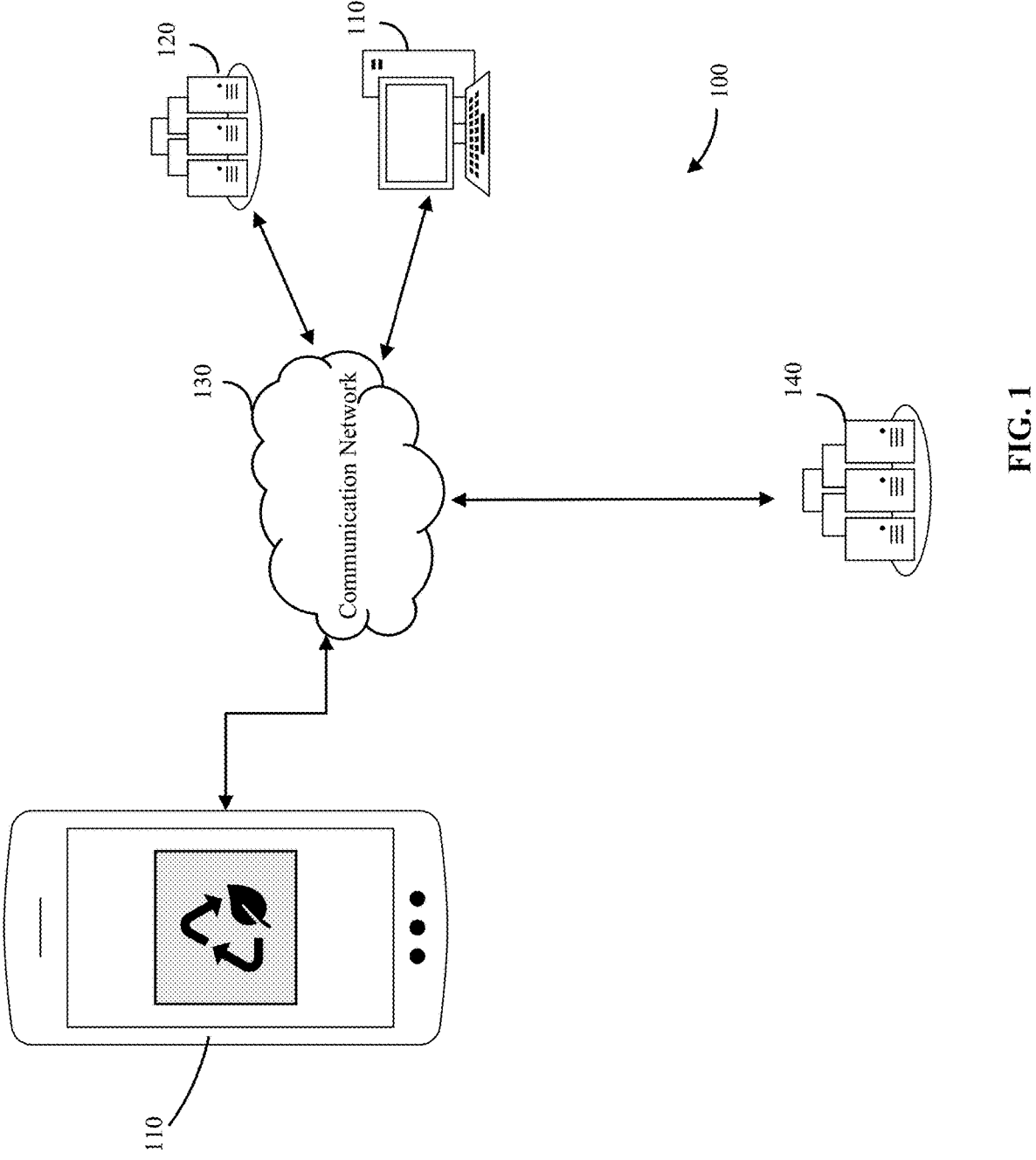
FIG. 1 depicts an example of a system for generating a non-fungible token in accordance with some embodiments of the present disclosure.

The present application includes embodiments of mechanisms (e.g., systems, methods, and media) for generating digital assets secured by cryptographic tokens, e.g., non-fungible tokens (NFTs), and which correspond to physical objects (e.g., articles of apparel, or articles of footwear), or which correspond to a set of entitlements to digital systems, or which correspond to benefits which can be provided by a manufacturer or retailer, or which correspond to virtual objects in a video game or metaverse. In some embodiments, this disclosure relates to cryptographic digital assets for articles, objects, or transactions including sustainability attributes or metrics associated with the objects, articles, or transactions. For example, cryptographic digital assets can be associated with, inter alia, tangible objects, including sports shoes, eyewear, apparel, headgear, or sporting gear, among other products, such as, e.g., watches, luggage, jewelry, storage or shipping containers, artwork, mobile phones or smartphones, tablets, televisions or other electronic devices, refrigerators or other appliances, and vehicles or other machines, or the articles or objects may be intangible objects, including graphic designs, virtual avatars or characters, graphic user interfaces, or other forms of communication.

Further, this disclosure relates to cryptographic digital assets that can be updated based on user activities and transactions, and methods for provisioning of such cryptographic digital assets and articles, and decentralized computing systems with attendant blockchain control logic for mining, exchanging, collaborating, modifying, combining, and/or blending blockchain-enabled digital assets and articles. The presently described technology relies on the trust established in and by blockchain technology to enable a company to control the creation, distribution, expression, and use of digital objects that represent their brand. Unlike typical digital assets that are freely reproducible without loss of content or quality, the use of discrete recordation of ownership via blockchain technology establishes an ownership of the digital asset, which may provide the owner of the NFT with certain rights, benefits, and entitlements that can be associated with ownership of the digital asset. The manufacturer of the NFT and the associated digital asset has the ability to control or limit the overall supply of the digital objects or traits/aspects thereof and may create a controlled scarcity if so desired. The present disclosure contemplates that, in some examples, the digital object may be representative of: a physical object offered for sale; a 2D or 3D design rendering or design file that may be suitable for future production; a virtual representation of an object that is not presently intended for physical creation/production; a proof of attendance at an event, or entitlement to attend an event; a representation of a user's interactions or transactions with a manufacturer or retailer; or other such objects. Further, some embodiments of the present disclosure include mechanisms for generating cryptographic tokens using virtual reality (VR), augmented reality (AR), and/or graphical user interfaces (GUIs) on computing devices.

In some embodiments, NFTs can secure, authenticate, or verify ownership of digital assets having different properties and different functions. A "Uniform Resource Identifier" or "URI" is a unique sequence of characters that identifies a logical or physical resource used by web technologies. URIs may be used to identify any resource, including non-virtual objects, such as locations or people, or digital information resources, such as web pages. The URI can comprise a "Uniform Resource Name" ("URN") or a "Uniform Resource Locator" ("URL"). A URI of an NFT can be a URL pointing to a digital asset, or metadata associated with a digital asset that is hosted on a server of a host system. The metadata of a digital asset can further include a URL where the digital asset is hosted remotely, off-chain or off of the blockchain. For example, accessing a URI of a sustainability NFT (e.g., a sustainability token) can include accessing the URI in a browser, and visually inspecting the attributes, which may be presented in a code-readable format (e.g., JSON, XML, HTML, etc.). A URI of a digital asset representing sustainability attributes of a transaction may return a list of the sustainability attributes, which could, in turn, be utilized by third party platforms (e.g., video game systems and digital marketplaces) to provide the owner of the digital asset some functionality or benefit.

In some embodiments, an NFT can function as a digital identity for an owner, and can provide access to digital markets, gateways, portals, APIs, games, or web pages which the owner would not otherwise be able to access. For example, an NFT can entitle the owner to access a webpage for a vendor that could provide the owner with access to exclusive benefits. In some embodiments, the benefits offered could be based on the type and metadata of an NFT.

As used herein, a "digital asset" refers to digital files or data for which ownership can be assigned. A digital asset could be a text document, an image file, a video, an audio file, a database file, code blocks, a database, an encryption key, or anything that can be represented digitally, and can be accessed at an addressable location. Further, the digital asset may be a digital-art version of a tangible, physical object or place, or an object disassociated with tangible, physical objects. The digital asset can include metadata which can describe aspects of the digital asset, functions, or properties of the digital asset, and can be formatted in a computer-readable format (e.g., json, xml, yml, html, etc.). A "cryptographic digital asset", as used herein, is a digital asset secured by (e.g., associated with) an NFT minted to a blockchain, or one that has a unique, non-fungible tokenized code ("token") registered on and validated by a blockchain platform or otherwise registered in an immutable database, thus cryptographically securing an interest in the digital asset to the owner of the NFT. An interest can, but need not, be an ownership interest in the cryptographic digital asset, a copyright thereof, a right to use the cryptographic digital asset in a third-party application, or any other interest which can be associated with the cryptographic digital asset.

A "smart contract" is an agreement that is in the form of a self-enforcing software program that runs on the block-chain network. The smart contract is distributed across a blockchain network and is itself immutable. The terms within a smart contract, such as one in an NFT, are dictated by one or more of the parties, and are encoded within the smart contract at the time the smart contract is deployed to the blockchain. When creating a smart contract, a party or multiple parties may include programming to allow for negotiation, modification, full or partial acceptance, full or partial refusal, and, ultimately, full or partial enforcement or waiver. It will be appreciated that, as used herein, consideration is merely something of value given in exchange from one party to the other and may be real or personal property, such as, e.g., currency, or may be a return promise, an act, or forbearance. Additionally, options are contracts in which an offeree gives consideration for a promise by the offeror not to revoke an outstanding offer, and options can be provided as part of a larger contract or, alternatively, the option may be the foundation of the contract itself. A smart contract in an NFT may, but need not, be legally enforceable. The code of a smart contract can include functions for reading from or writing to the smart contract. For example, a smart contract can include a function that returns information about a digital asset, or a function returning information about an owner of a digital asset. Additionally or alternatively, a function of a smart contract could be called (e.g., code of the function could be executed) by an owner of the contract to distribute funds exchanged in the execution of the smart contract.

As used herein, the term "cryptographic token" is a digital value that is stored/recorded on a blockchain. Cryptographic tokens include payment tokens, such as coins (e.g., Bitcoin), utility tokens, security tokens, and "non-fungible tokens." As used herein, "non-fungible token" ("NFT") refers to a cryptoasset in the form of a unique, cryptographic token corresponding to a digital asset, which can include any of the examples of a digital asset listed above. The NFT may be a blockchain-based deed of digital ownership and/or certificate of authenticity of a digital asset. As used herein, an NFT is not a digital asset, but is used to signify ownership of the digital asset. The NFT can be built (i.e., minted) in accordance with contemporary and relevant standards, such as, e.g., an Ethereum Request for Comments (ERC) 721 (Non-Fungible Token Standard) or ERC1155 (Multi Token Standard) among other relevant standards and as appropriate for the particular blockchain network and applications used therewith.

Further, an NFT is built or minted in accordance with the terms of a smart contract. The particular conditions and terms of a smart contract can govern details of a transaction involving the minting or transfer of an NFT, and the terms can impact the value or, at least, the perceived value of the NFT over time. For example, a smart contract can enforce a rarity of NFTs minted under the smart contract by limiting the maximum allowable number of NFTs which can be minted under the contract. In some cases, a smart contract can include terms mandating that a royalty be paid to the owner of the smart contract upon a secondary sale of an NFT. In essence, the NFT represents authentication of the transaction and serves as a record of this authentication on a blockchain ledger (e.g., Bitcoin, Ethereum, and the like). As such, the NFT itself may fluctuate in value depending on various aspects of the transaction, e.g., the parties involved, value exchanged, time and/or date, exclusivity, or combinations thereof, among other factors. Further, the number and/or frequency of transactions may also cause the NFT to fluctuate in value.

A digital asset can be accessible at a web address (i.e., the URI) that is referenced in the non-fungible token securing it. The web address can be a link which, when accessed, can serve the digital asset, or could serve information or meta-data of the digital asset. Because of a cost associated with storing information in a non-fungible token, the token itself may contain only enough information to identify the digital asset and prove ownership, with the rest of the information about the digital asset residing on computer systems that are not themselves nodes in the blockchain. Accessing the web address can return a list of properties of the digital asset to the user through a graphical user interface, or, alternatively, in a format that is consumable by computer programs and applications that may access the digital asset. For example, the web address could return information about the digital asset in JSON format or XML format, and the address of the digital asset itself could be included in the list of properties.

A digital asset representing a transaction could thus have properties specifying the time of the transaction, a selling party, information about products purchased, sustainability attributes of products and of the transaction, etc. In some cases, an address referenced in a non-fungible token could be an API endpoint that may vary information returned to the user, or implement a function based on the HTTP method through which the API endpoint is accessed. The API endpoint could allow a user or system to perform a GET, HEAD, PUT, or POST, for example, which could allow a digital property of the digital asset to be changed based on the operation performed. The GET and HEAD operations can be read-only operations and can provide publicly available information about the digital asset without the need for authentication. Access to the write operations (e.g., POST, PUT) of the API endpoint referenced in an NFT can require authentication, and could thus only be accessible to the manufacturer of the NFT and digital asset, for example.

Some embodiments of the present disclosure are directed to digital assets that can include sustainability data for transactions performed by a user. A digital asset, according to some embodiments can include a volume of carbon emissions associated with products purchased by a consumer. In another example, a digital asset for a transaction can indicate whether products purchased in a transaction were locally sourced or manufactured using sustainable practices. Some embodiments of the present disclosure are directed to NFTs that, alternatively or additionally to representing physical or digital collectables, can authenticate ownership or entitlement to a benefit. A digital asset whose ownership is tied to an NFT, for example, could be a user's account with a manufacturer or retailer for example, which could include digital properties in the form of information about transactions made by the user, products purchased, dates of activities, cumulative totals of the value exchanged for goods or services, or any other information that could be associated with a customer account. Benefits may be accrued or provided based on the digital properties or information of the digital asset, and the benefits could include access to exclusive products or designs, access to limited-edition products, admission tickets to attend real or virtual events, discounts on products, access to digital systems, etc.

Accounts provided as digital assets secured by NFTs may provide privacy benefits to individuals that may otherwise be averse to signing up for an account with a manufacturer or retailer, as purchases and activity could be associated to the NFT, without including identifying information about the user. Further, the ability to sell or transfer ownership of an account by transferring an account NFT can provide an incentive for a user to perform activities that could result in the provision of a benefit, as doing so can enhance the value of the NFT, which can correspond to a value of the digital asset secured by the NFT. Sales of an account or utility NFT can further provide a revenue stream to a manufacturer or retailer, as the originator of the NFT could receive a royalty or commission for any secondary sales of the NFT. In other embodiments, an NFT could represent an entitlement to a benefit, including, for example, access to restricted portions of a web site, access to exclusive events or products, entitlements to discounts, entitlements to integration with third-party applications such as games, etc. The digital asset for such an NFT can include information about the benefit, or, alternatively, a computer system of a retailer could include information about the benefit.

NFTs can be created, recorded, or "minted" into the blockchain ledger stored in the blockchain network, and thereby stored in memory of one or more of the blockchain nodes. Further, such cryptographic tokens can be destroyed or "burned" by permanent removal from circulation in the blockchain network. Burning can be accomplished in a variety of ways, including by transferring ownership of the cryptographic token to a general, null address that is inaccessible and unowned. Manufacturers, also referred to herein as brands or organizations, may burn cryptographic tokens to create scarcity within the marketplace, or to trigger a condition, or as a result of a condition, or for security purposes. For example, a brand may release, e.g., "drop," a collection of digital assets secured or identified by cryptographic tokens, and then may burn any unsold cryptographic tokens within the collection to preserve exclusivity of those sold. In another example, a brand may drop a collection of digital assets secured or identified by NFTs with the condition that purchasers may only have access to their purchased digital asset when all or a particular quantity of the collection has been purchased, which may be expedited by the brand then burning unsold NFTs to meet the condition prematurely.

There are several ways a user can be enabled to unlock or acquire a cryptographic asset. In one example, upon scanning a product at a point-of-sale (POS) terminal during first purchase, a unique NFT and corresponding private key are automatically generated and assigned to the user's blockchain wallet. In another example, a private key is provided to the user via a printed or digital receipt, a visual or electronic ID tag (RFID or NFC) hidden in or applied to the product, a pop-up message or email sent to a personal user account, a push notification or text message sent to a smartphone, or some other record, and the consumer uses the private key to link the cryptographic asset to their digital blockchain wallet. Another example may require the user to assemble the private key in part via a physical code or Unique Product Identifier (UPID), e.g., a serial number, associated with the product (on the packaging or box, on a hang tag, under a label, embedded within a QR code on the product or packaging, embedded within a club head or shaft, embedded within a shoe or sole, etc.) and in part via a transaction authentication code (i.e., to prevent a consumer from collecting a cryptographic asset while merely handling products in a store). As another example, an NFT could be offered for sale directly in an NFT marketplace, directly at a POS system, or on a digital storefront of a retailer or manufacturer.

Another example may require the user to "seek" cryptographic assets in stores, whether physical stores or virtual stores inside a metaverse or game, by using a photographic capture function or augmented reality ("AR") function on a handheld personal computing device. For this method, a private key may be provided via the validated transaction; however, the user must separately find a hidden cryptographic asset in an AR hidden within the store or local area before the digital asset can be transferred to their wallet (i.e., the cryptographic key and the virtual object must both be separately acquired before the transfer occurs).

In a representative example, an authenticated product is created and assigned a UPID. Upon purchase by a consumer, the UPID may be used to unlock a cryptographic digital asset composed of a sustainability digital asset associated with a unique non-fungible token (NFT) on a block-chain based distributed computing platform. In general, a consumer must have or procure a blockchain wallet address (e.g., an Ethereum hardware wallet) to purchase, unlock, or acquire an NFT securing a cryptographic digital asset. The blockchain wallet may be used to store a private key belonging to the cryptographic digital asset and may be linked to a personal account that is registered with the retailer or manufacturer of the product.

Now referring to the figures, FIG. 1 illustrates an example system 100 for generating an NFT in accordance with some embodiments of the disclosed subject matter. In other embodiments of the disclosed invention, however, a system similar to system 100 could be used to generate other types of NFTs, including, for example, account NFTs and a footwear NFT. As shown in FIG. 1, the system 100 may include one or more computing devices or user devices 110, one or more servers 120, and one or more servers 140.

Still referring to FIG. 1, the one or more computing devices 110 can receive data corresponding to one or more products. Additionally, or alternatively, the one or more computing devices 110 can receive input data from a user that correspond to attributes of one or more digital products. The one or more computing devices 110 can execute at least a portion of the system 100 to generate one or more NFTs corresponding to a transaction including the one or more products. Additionally, or alternatively, the one or more computing devices 110 can communicate data corresponding to the one or more products to one or more servers 120 and/or one or more servers 140 over one or more communication networks 130 or other connections. The one or more servers 120 can execute at least a portion of the system 100. In such embodiments, the one or more servers 120 can receive data corresponding to one or more products. Additionally, or alternatively, the one or more servers 120 can receive input from a user that correspond to attributes of one or more products. The one or more servers 120 can execute at least a portion of the system 100 to generate one or more NFTs corresponding to the one or more products. Further, information about digital assets, secured by one or more NFTs can be stored on servers 140.

Figure 2:
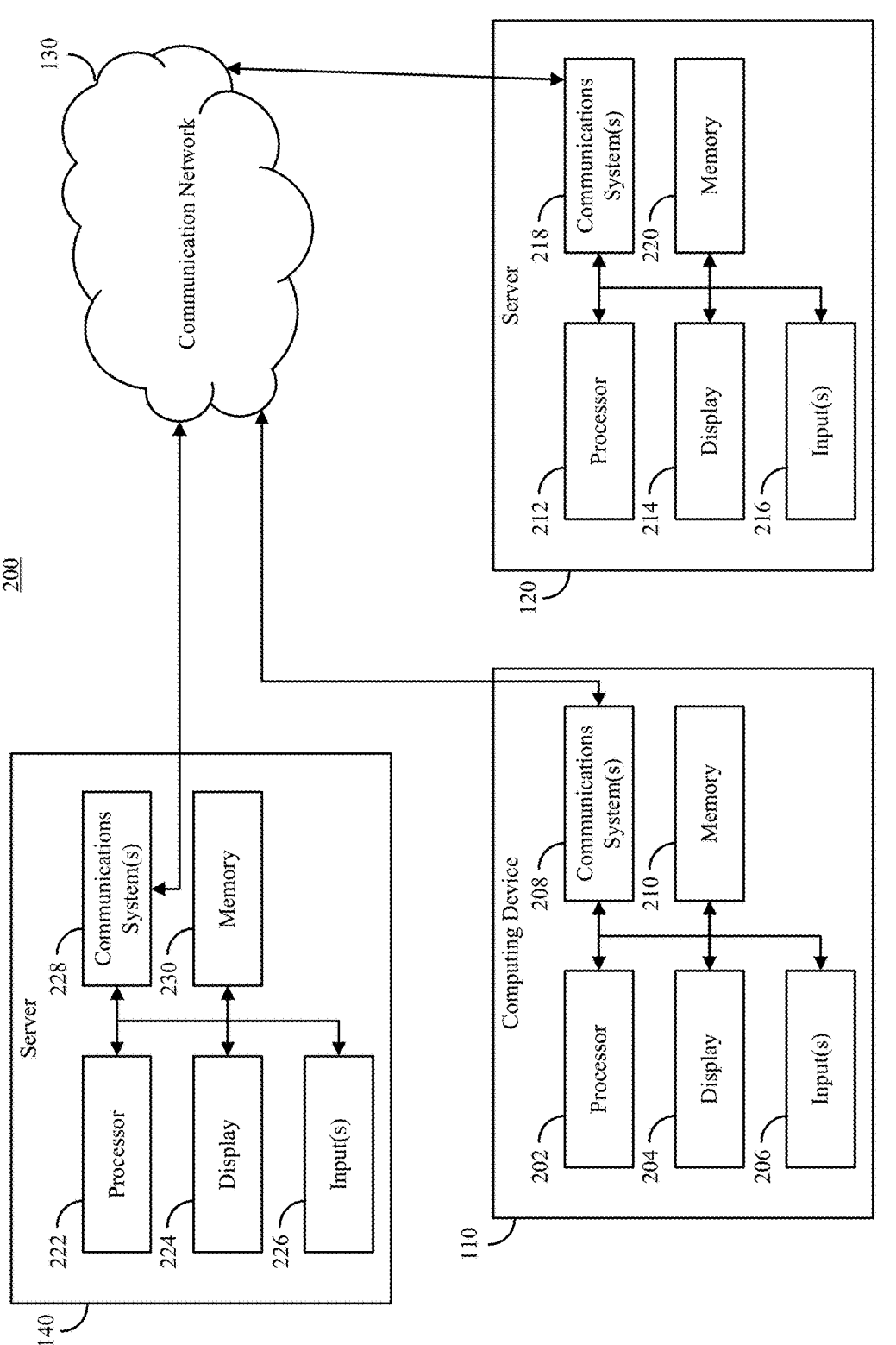
FIG. 2 depicts an example of hardware that can be used to implement a computing device and a server, shown in FIG. 1, in accordance with some embodiments of the disclosed subject matter.

FIG. 2 shows an example of hardware 200 that can be used to implement the computing device 110 and/or server 120 in accordance with some embodiments of the present disclosure. As shown in FIG. 2, in some embodiments, the computing device 110 can include a processor 202, a display 204, one or more inputs 206, one or more communication systems 208, and/or a memory 210. In some embodiments, the processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, the display 204 can include any suitable display devices, such as a computer monitor, a touchscreen, a television, etc. In some embodiments, the inputs 206 can include any suitable input devices and/or sensors that can be used to receive user input, such as a keyboard, a mouse, a touchscreen, a microphone, a camera, etc.

In some embodiments, the communications systems 208 can include any suitable hardware, firmware, and/or software for communicating information over communication network 130 and/or any other suitable communication networks. For example, the communications systems 208 can include one or more transceivers, one or more communication chips and/or chip sets, etc. In a more particular example, the communications systems 208 can include hardware, firmware, and/or software that can be used to establish a Wi-Fi connection, a Bluetooth connection, a cellular connection, an Ethernet connection, etc.

In some embodiments, the memory 210 can include any suitable storage device or devices that can be used to store instructions, values, etc., that can be used, for example, by the processor 202 to generate a non-fungible token, to present a digital asset using the display 204, to communicate with the server 120 via communications system(s) 208, etc. The memory 210 can include any suitable volatile memory, non-volatile memory, storage, or any suitable combination thereof. For example, the memory 210 can include random access memory (RAM), read-only memory (ROM), electronically-erasable programmable read-only memory (EE-PROM), one or more flash drives, one or more hard disks, one or more solid state drives, one or more optical drives, etc. In some embodiments, the memory 210 can have encoded thereon a computer program for controlling operation of the computing device 110. For example, in such embodiments, the processor 202 can execute at least a portion of the computer program to receive inputs from a graphical user interface for customizing an article of footwear, store in memory an image of a digital asset based on the user's customizations, generate a non-fungible token based on the digital asset, and mint the non-fungible token to a blockchain network made up of the computing devices 110 and/or servers 120. As another example, the processor 202 can execute at least a portion of the computer program to implement the system 100 for generating an NFT corresponding to a paired digital and physical article of footwear. As yet another example, the processor 202 can execute at least a portion of processes 500, 600, and 900 described below in connection with FIGS. 5, 6, and 9.

In some embodiments, the server 120 can include a processor 212, a display 214, one or more inputs 216, one or more communications systems 218, and/or a memory 220. In some embodiments, the processor 212 can be any suitable hardware processor or combination of processors, such as a CPU, a GPU, an ASIC, an FPGA, etc. In some embodiments, the display 214 can include any suitable display device, such as a computer monitor, a touchscreen, a television, etc. In some embodiments, inputs 216 can include any suitable input devices and/or sensors that can be used to receive user input, such as a keyboard, a mouse, a touchscreen, a microphone, a camera, etc.

In some embodiments, the communications systems 218 can include any suitable hardware, firmware, and/or software for communicating information over communication network 130 and/or any other suitable communication networks. For example, the communications systems 218 can include one or more transceivers, one or more communication chips, and/or chip sets, etc. In a more particular example, the communications systems 218 can include hardware, firmware and/or software that can be used to establish a Wi-Fi connection, a Bluetooth connection, a cellular connection, an Ethernet connection, etc.

In some embodiments, the memory 220 can include any suitable storage device or devices that can be used to store instructions, values, etc., that can be used, for example, by the processor 212 to present content using display 214, to communicate with one or more computing devices 110, etc. The memory 220 can include any suitable volatile memory, non-volatile memory, storage, or any suitable combination thereof. For example, the memory 220 can include RAM, ROM, EEPROM, one or more flash drives, one or more hard disks, one or more solid state drives, one or more optical drives, etc. In some embodiments, the memory 220 can have encoded thereon a server program for controlling operation of the server 120. For example, in such embodiments, the processor 212 can execute at least a portion of the server program to receive inputs from a GUI for customizing an article of footwear, store in memory (e.g., memory 220) an image of a digital asset based on the user's customization, generate an NFT based on the digital asset, and/or mint the NFT to a blockchain network made up of the computing devices 110 and/or servers 120. As another example, the processor 212 can execute at least a portion of the server program, which can be a smart contract, to implement the system 100 for generating an NFT corresponding to a product or transaction. As yet another example, the processor 202 can execute at least a portion of process 500, 600, and 900 described below in connection with FIGS. 5, 6, and 9.

In some embodiments, the server 140 can include a processor 222, a display 224, one or more inputs 226, one or more communications systems 228, and/or a memory 230. In some embodiments, the processor 222 can be any suitable hardware processor or combination of processors, such as a CPU, a GPU, an ASIC, an FPGA, etc. In some embodiments, the display 224 can include any suitable display device, such as a computer monitor, a touchscreen, a television, etc. In some embodiments, the inputs 226 can include any suitable input devices and/or sensors that can be used to receive user input, such as a keyboard, a mouse, a touchscreen, a microphone, a camera, etc.

In some embodiments, the communications systems 228 can include any suitable hardware, firmware, and/or software for communicating information over communication network 130 and/or any other suitable communication networks. For example, the communications systems 228 can include one or more transceivers, one or more communication chips, and/or chip sets, etc. In a more particular example, the communications systems 228 can include hardware, firmware and/or software that can be used to establish a Wi-Fi connection, a Bluetooth connection, a cellular connection, an Ethernet connection, etc.

In some embodiments, the memory 230 can include any suitable storage device or devices that can be used to store instructions, values, etc., that can be used, for example, by the processor 222 to present content using the display 224, to communicate with one or more computing devices 110, etc. The memory 230 can include any suitable volatile memory, non-volatile memory, storage, or any suitable combination thereof. For example, the memory 230 can include RAM, ROM, EEPROM, one or more flash drives, one or more hard disks, one or more solid state drives, one or more optical drives, etc. In some embodiments, the memory 230 can have encoded thereon a server program for controlling operation of the server 140. As an example, the processor 222 can execute at least a portion of process 500, 600, and 900 described below in connection with FIGS. 5, 6, and 9.

Figure 3:
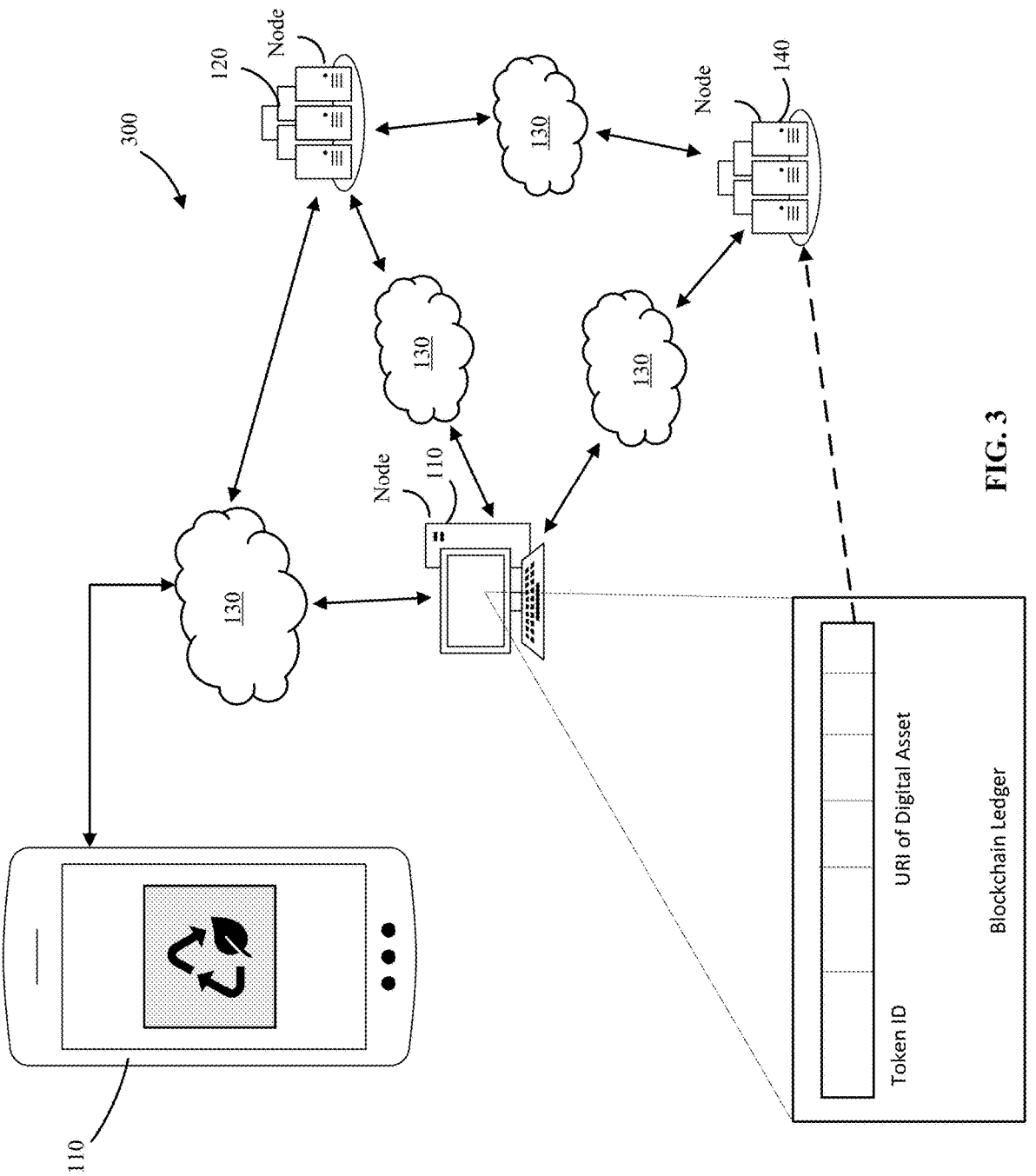
FIG. 3 depicts a schematic representation of an example blockchain network according to some embodiments of the present disclosure.

Referring now to FIG. 3, an example blockchain network 300 is illustrated according to some embodiments of the present disclosure. The blockchain network 300 may include one or more blockchain nodes, which may each be a computing device 110 (e.g., similar to computing device 110 of FIGS. 1 and 2), or a server 120 (e.g., similar to server 120 of FIGS. 1 and 2) that are in communication with one another (e.g., via a communication network similar to the communication network 130 of FIGS. 1 and 2). The NFT may be stored in a blockchain ledger stored on one or more of the blockchain nodes (e.g., "minted" into the blockchain ledger stored in the blockchain network, and thereby stored in memory of one or more of the blockchain nodes). For example, attributes of the NFT may be stored in memory on a local computing device (e.g., computing device 110), and may be copied into the memory of one or more blockchain nodes (e.g., servers, such as the server 120, and/or computing devices that may be similar to the computing device 110). The one or more blockchain nodes may be responsible for storing data that is contained in the blockchain ledger. Each of the one or more blockchain nodes may store (e.g., in memory, such as, the memory 210 or 220) a copy of the blockchain ledger (e.g., a deed tracking various transactions of, and modifications to, an NFT securing a digital asset, such as a sustainability digital asset).

The information of an NFT stored in the blockchain may be minimal, as there may be a cost associated with storing information on the blockchain. Therefore, metadata of the digital asset, and the digital asset itself can be stored in a memory (e.g., the memory 230) or storage of the one or more servers 140. A URI can be stored with the NFT on any of the computing devices 110, 120, and can include an address of the digital asset stored on the one or more servers 140, so that information about the digital asset can be obtained from the URI stored in the NFT, and the users of the blockchain network do not pay a disproportionate price for storing digital assets on the blockchain network.

The one or more blockchain nodes may each be a computing device located at one or more geographic locations, thereby creating a decentralized computing architecture. The blockchain network may be a public network (e.g., available to any user), or a private network (e.g., available to a specific set of users). For example, an organization may develop an application for storing NFTs corresponding to transactions of physical and/or digital products (e.g., sports shoes, electronics, watches, eyewear, headgear, sports equipment, or articles of apparel). The application may be a mobile application, or desktop application, or a web-based applet, comprising computer-readable instructions stored in, for example, memory 210 or 220, and configured to be executed by, for example, processor 202 or 212 (see FIG. 2). Any user who downloads the application onto a computing device, may then add their computing device to the blockchain network as a blockchain node. In some embodiments, the blockchain network may be private and, thus, limited to users who download the organization's application and obtain authorization to participate.

If the application is available to the public, then the blockchain network may be a public network. However, if the organization restricts who has access to the application or restricts authorization for select individuals who download the application from becoming a blockchain node, then the blockchain network may be a private network, such as e.g., a permissioned network. Generally speaking, the permissioned network is a distributed ledger that is not publicly accessible and can only be accessed by users with certain permissions, and the users can only perform specific actions granted to them by the central owner or the ledger administrators and are required to identify themselves through certificates or other digital means. In some embodiments, the blockchain network may be a known blockchain network (e.g., Bitcoin, Ethereum, or the like), and the permissioned network may be a sub-set or service associated with a known blockchain network.

The blockchain network may be an open, yet encrypted peer-to-peer network in which asset transaction records are linked via cryptographic hash functions in a distributed, immutable ledger of interconnected blocks. Each blockchain node may contain a ledger of blocks that includes one or more digital asset transactions accompanied by corroboration information representing a validity of each transaction as assessed by peer-validation devices (e.g., the other blockchain nodes in the blockchain network). Encrypted, decentralized computing architectures allow for authentication of transacted assets while preventing duplication of ownership of a cryptography-protected ("cryptographic") digital asset registered to the blockchain network. Decentralized asset management may work by encrypting a proprietary asset file, breaking the encrypted code into segments, and sending the segments to numerous different blockchain nodes (e.g., the blockchain nodes of FIG. 3) in the blockchain network. A validated owner may be provided with a private key that indicates where in the network the digital asset is located and how to reassemble or "decrypt" the file. For use as a distributed ledger, an individual blockchain may be managed by a host administrator and distributed to multiple peers collectively adhering to a protocol for inter-node communication and transaction validation.

The sustainability NFT (i.e., the NFT representing ownership of the sustainability digital asset) may be stored in the blockchain network. The sustainability NFT may include, or may reference metadata corresponding to sustainability attributes of a product or transaction (e.g., carbon emissions, recyclability, distance transported, fuel consumption, information about manufacturing facilities, etc.), and a token ID. The token ID may be a 32-bit, 64-bit, or 128-bit alphanumeric code that is sectioned into individual segments. For example, the alphanumeric code may be sectioned into 2 segments, 4 segments, 8 segments, 16 segments, or 32 segments. The NFT can include a URI specifying a location where metadata of the digital asset can be located. The metadata provided at the web address specified can serve a list or attributes of the digital asset in JSON format that is provided in accordance with contemporary and relevant standards, such as, e.g., an Ethereum Request for Comments (ERC) 721 (Non-Fungible Token Standard) or ERC1155 (Multi Token Standard), among other relevant standards and as appropriate for the particular blockchain network and applications used therewith. This metadata can be stored on the one or more servers 140, which can be controlled by the manufacturer or the retailer.

For example, using the example of a sustainability NFT, the metadata provided at the URI address specified in the NFT and hosted on servers 140 can correspond to one or more attributes from the group of: a retailer of products associated in a transaction, carbon emissions produced in the transaction, a distance travelled by products of the transaction, carbon offsets purchased by a purchaser, a recyclability of products purchased in a transaction, a proportion of the products manufactured using recycled products, a number of recycling cycles of the recycled products, and non-renewable and/or renewable energy (e.g., water, power, etc.) used in the production of the products associated with the transaction. Additional combinations of the above-listed attributes should be recognized by those of ordinary skill in the art.

One should appreciate that the disclosed systems and techniques provide many advantageous technical effects including construction and storage of a digital asset blockchain representing user-to-user transactions of virtual collectables. Further, the blockchain technology enables the creation of unique, yet fully transferrable digital assets that maintain value by way of the general inability to make lossless copies, unlike traditional, unsecured digital files.

Figure 4:
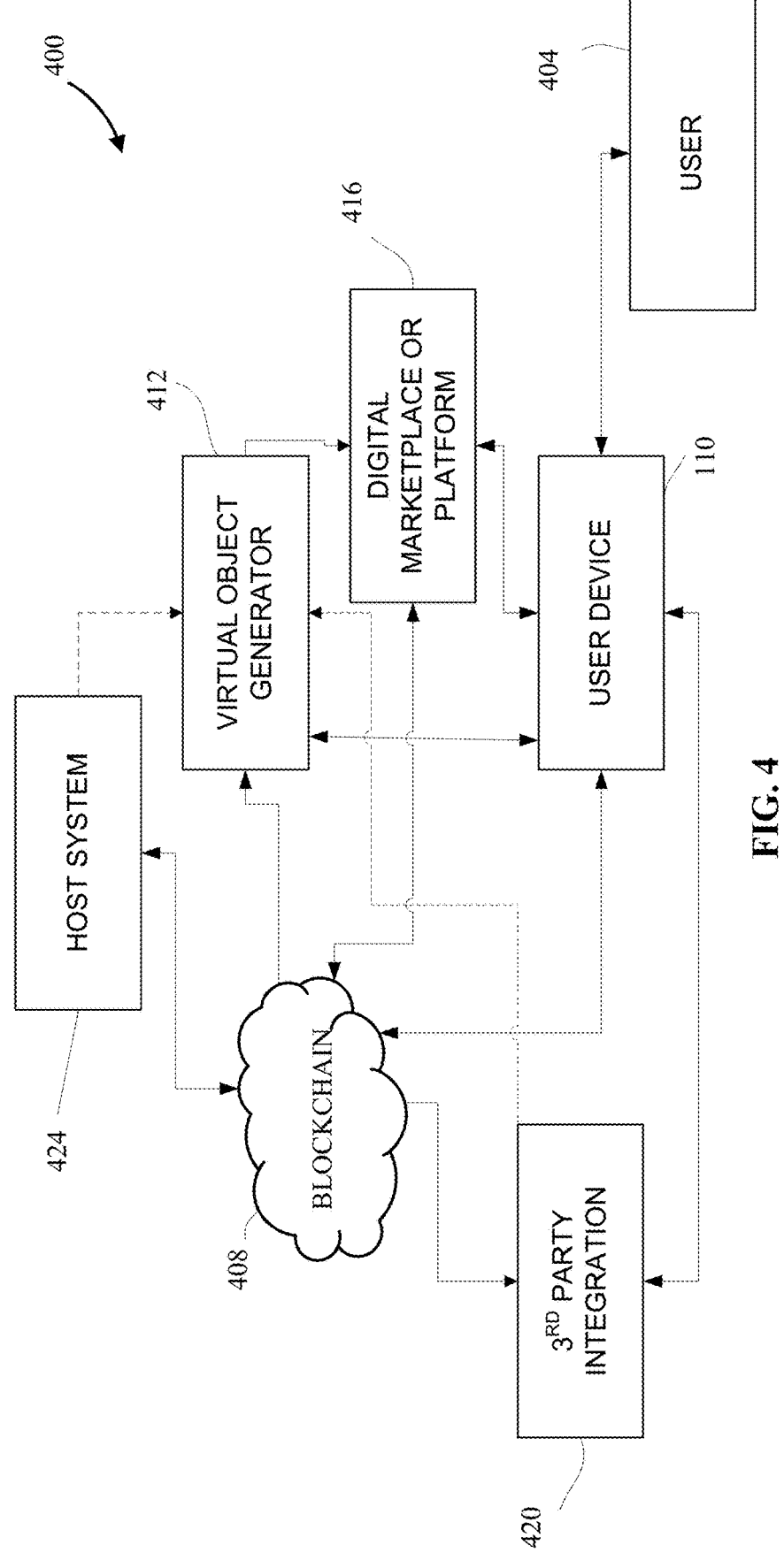
FIG. 4 depicts another schematic representation of an example blockchain network according to some embodiments of the present disclosure.

Now referring to FIG. 4, a schematic representation is provided of a functional structure of a decentralized computing system 400 implementing a blockchain network 408, similar to the blockchain network 300 of FIG. 3. As generally illustrated, a user 404 may operatively interface with the user device 110 that may include one or more of a smartphone, a tablet computer, a smart watch, a laptop computer, a desktop computer, a standalone video game console, smart footwear/apparel, or other similar internet enabled devices, e.g., a television, an exercise machine or device, or a vehicle, among other examples. The user device 110 may be operatively configured to communicate with one or more of an immutable public database (e.g., a blockchain service/network 408—referred to as "blockchain network 408"), a virtual object generator 412, an online digital marketplace or platform 416, and/or a third ($3^{rd}$) party integration service 420.

In general, the blockchain network 408 may include at least one non-fungible token registered thereon that includes information representative of a digital asset. The user 404, via the user device 110, may be in possession of or may have a wallet that includes a private cryptographic key that permits the user device to read the encrypted data associated with the token. This key may further enable the user 404 to freely transfer ownership of the token.

A virtual object generator 412 may be provided to create a digital object or a digital asset on the basis of the information associated with the token. The virtual object generator 412 may employ a plurality of style and artistic rules such that images associated with the resultant digital objects are unique, yet recognizable according to predefined silhouettes, styles, articles, or characters. In some embodiments, the virtual object generator 412 may create the virtual object on the basis of auxiliary factors, such as the age of the asset, user activity (tracked via the user device, a mobile application, attendance at a sporting event, etc.), or use via third party platform. The virtual object generator 412 and/or blockchain network 408 may further be in communication with a hosted digital marketplace 416, forum, social platform, or the like.

The digital marketplace may represent a plurality of virtual objects in a manner that permits the organized trade and/or sale/purchase of the virtual objects between parties. Upon closing of the sale or transfer, the digital marketplace 416 may update the blockchain network 408 with the new ownership information and facilitate the transfer of new or existing keys to the new asset holder. In some embodiments, the marketplace 416 may further enable various social engagement functions, such as voting or commenting on the represented virtual objects. Likewise, in some instances the marketplace 416 may be configured to assess and score the scarcity of a particular virtual object based on the sum total of the object's expressed features or characteristics, as well as consideration of any of the auxiliary factors. Such a scarcity score may then enable the marketplace (and/or users who participate within the marketplace) to better assess the value of the object.

Still referring to FIG. 4, the system 400 may further include a 3rd party integration service 420 that may enable the use of the virtual object in different contexts or manners. The 3rd party integration service 420 may operate as an API on an app provided on the user's device, or as a dedicated cloud-based service. In some embodiments, the 3rd party integration service 420 may make the virtual object (e.g., as expressed by the virtual object generator 412), and/or the information available for external use. Examples of such a use may include skins on 3rd party video game characters, objects capable of being used by 3rd party video game characters, digital artwork displays, physical 2D print generation, manufacturing production, such as, e.g., 3D print generation, and the like. In some embodiments, the information and/or scarcity score may be made available and may alter the characteristics or abilities of a user's video game character in a video game played on the user's device 110. A corporate host system 424 may be in communication with the blockchain network 408 for the purpose of provisioning and/or initially creating new digital assets and storing or updating metadata associated with the assets. Additionally, the host system 424 may provide one or more rules to the virtual object generator 412 to constrain the manner and style in which genomic information from the blockchain network 408 is expressed in a visual/artistic form.

Figure 5:
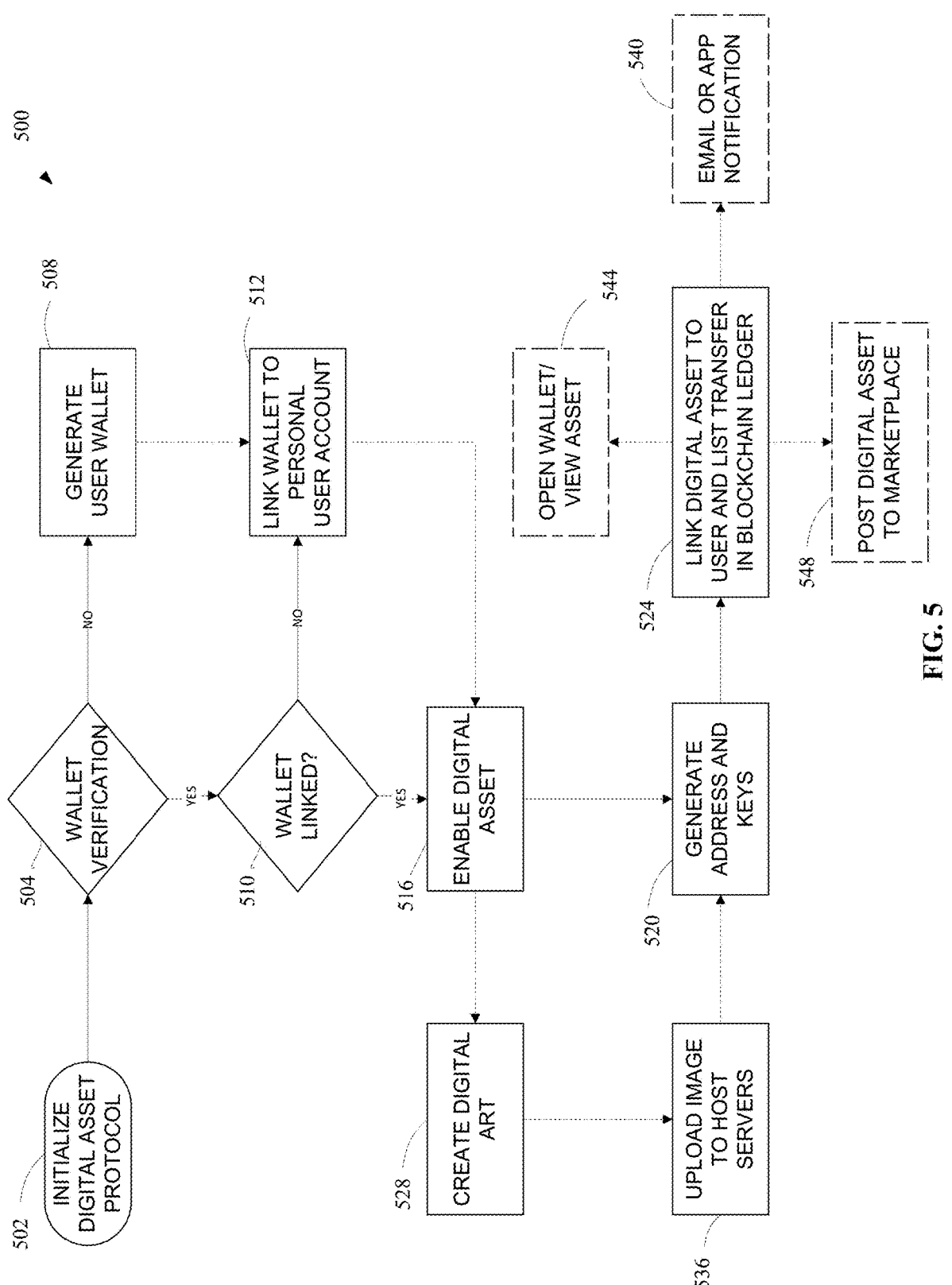
FIG. 5 depicts a flowchart for an example method of generating a digital asset protected by a non-fungible token according to some embodiments of the present disclosure.

With reference to FIG. 5, a method of generating a digital asset protected by NFTs on a blockchain ledger is generally described in accordance with aspects of the present disclosure. Some or all of the operations in FIG. 5 and described in further detail below may be representative of an algorithm that corresponds to processor-executable instructions that may be stored, for example, in main or auxiliary remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation block may be changed, additional blocks may be added, and some of the blocks described may be modified, combined, or eliminated.

The method 500 of FIG. 5 starts at terminal block 502 with processor-executable instructions for a programmable controller or control module or similarly suitable processor to call up an initialization procedure for a protocol to generate a cryptographic digital asset, such as a computer-generated digital shoe and encrypted token key, for a consumer product. This routine may be called-up and executed in real-time, continuously, systematically, sporadically, and/or at regular intervals. As a representative implementation of the methodology set forth in FIG. 5, the initialization procedure at block 502 may automatically commence each time a pair of footwear is manufactured, at various stages of the supply chain and manufacturing process, when a user 404 purchases a product or performs a transaction from a retailer, or each time the user 404 unlocks an access key. Alternatively, the initialization procedure may be manually activated by an employee at a POS terminal or by the retailer or the manufacturer.

Other initialization procedures may be initiated for different digital assets, which may represent assets other than physical products. For example, a digital asset could represent a proof of attendance at a given event. Accordingly, the digital asset could be spawned upon a confirmation of attendance at an event. Alternatively, a limited number of "proof of attendance" NFTs may be minted for an event, and those NFTs may be earned by attendees on a first-come first-serve basis, or attendees could earn the remaining NFTs by scanning a QR code, for example. Digital assets can correspond to utility NFTs, which can provide a functionality to the owner. For example, a digital asset can entitle the owner to access to benefits or exclusive content, e.g., as discussed further below and with respect to FIG. 6.

In some cases, the computing device 110 is a user device such as, e.g., a portable electronic device, including a smartphone, or other electronic device. Using a user device 110, the user 404 may launch a dedicated mobile software application (app) or web-based applet that collaborates with a server-class (backend or middleware) computer (e.g., a remote host system) to communicate with the various peer devices on the decentralized computing system 400. During a communication session with, e.g., the host system 424, the user 404 may purchase a pair of footwear using a corresponding feature provisioned by the app. The user 404 enters the personal information and a method of payment to complete the transaction. Upon completion of a validated payment, the host system 424 receives, e.g., from an online store transaction module or an approved third-party electronic payment system, a transaction confirmation to indicate a validated transfer of the footwear to the user 404 has been completed. As indicated above, validated transfer of the footwear may be effectuated through any available means, including at a brick-and-mortar store, through an online auction website, an aftermarket consumer-to-consumer trade/sale, etc. In other embodiments, the user 404 may perform other transactions, or purchase other products (e.g., apparel, backpacks, hats, watches, sports equipment, footwear, eyewear, etc.). In some embodiments, the user 404 may purchase a digital asset represented by an NFT directly.

Next, the method 500 proceeds to decision block 504 to determine if the user 404 has procured a cryptocurrency wallet or other similarly suitable digital blockchain account that is operable, for example, to upload and maintain location and retrieval information for digital assets that are encrypted and stored in a decentralized manner. A cryptocurrency wallet typically stores public and private key pairs but does not store the cryptocurrency itself; the cryptocurrency is de-centrally stored and maintained in a publicly available blockchain ledger. With the stored keys, the owner may digitally sign a transaction and write it to the blockchain ledger. A platform-dictated smart contract associated with the wallet may facilitate transfer of stored assets and create a verifiable audit trail of the same. If the user 404 has not already acquired a digital blockchain wallet, the method 500 continues to the predefined process block 508 to set up a wallet. By way of non-limiting example, user 404 may be prompted to visit or may be automatically routed to any of an assortment of publicly available websites that offer a hardware wallet for cold storage of cryptocurrency such as an ERC20-compatible Ethereum wallet provided by MyEtherWallet, or Metamask, among other viable sources or providers.

Once the system confirms that the user 404 has a suitable digital blockchain wallet at process block 504, the method 500 may check if the wallet is linked to a personal user account at decision block 510. In some instances, the user 404 may have already linked a wallet to a user account in a prior transaction, and thus, the method 500 could proceed to process block 516. In instances where the user 404 has not linked their wallet, the method 500 may automatically link, or prompt the user 404 to link, the digital blockchain wallet to a personal user account, as portrayed at process block 512 of FIG. 5. This linking at process block 512 may proceed automatically if a wallet was generated at process block 508, without the need to perform a check at decision block 510 of whether the wallet has been linked. Linking a wallet to a personal account at process block 512 may require the remote host system 424 to retrieve a unique owner ID code associated with the purchasing party (e.g., user 404) from an encrypted relational database, e.g., provisioned through cloud computing system 130. At this time, a unique physical golf club ID code associated with the purchased golf club may be linked to the user's personal account.

Upon determining that the user 404 has acquired a digital blockchain wallet, i.e., block 504=YES, and that the wallet is linked to a personal user account, i.e., block 510=YES, or after linking the user's blockchain wallet to their personal user account at block 512, the method 500 continues to input/output block 516 to enable a sustainability cryptographic digital asset (e.g., a sustainability digital asset associated with a physical product, which can include clothing items, shoes, golf clubs, golf products, sports equipment etc., or with the production and sale thereof). In some cases, upon purchasing a product, the universally recognized UPID product code may be used to retrieve sustainability information of the product (e.g., from a relational database, digital assets associated with the product, etc.), which may further be used to generate a digital asset and a corresponding sustainability NFT. In some cases, a UPID can be used to retrieve other information of a physical product, or enable additional blockchain functionality. As an example, upon purchasing a physical product (e.g., a clothing item, a pair of shoes, a golf club, a golf bag, a golf ball, a basketball, a tennis racket, a baseball bat, or any other article of sports equipment), a UPID associated with the physical product may be used to retrieve a collectable NFT, which is identified by an encrypted token key and is generally associated with a collectable digital product (e.g., a digital product corresponding to the physical product). In some embodiments, the UPID may be used to trigger a function of the collectable NFT, such as compensation for a third party. A third-party or a retailer at a POS terminal or the user 404 employing their user device 110 may scan the UPID or UPC on the physical product (e.g., on the physical product directly or on a box or packaging storing the product). Accordingly, enabling a cryptographic digital asset, at block 516, may be automatic, random, systematic, prize based, or any logically appropriate manner.

After receiving confirmation that a cryptographic digital asset has been authorized at input/output block 516, the method 500 generates a cryptographic digital asset for the transacted product or products. This may comprise generating a unique, encrypted asset code with a contract address (i.e., the address where the smart contract is deployed on the blockchain network), a token, and a public and private key pair, as denoted at predefined process block 520. Host system 424 may transmit the token, with the public key and the owner ID, to a distributed blockchain ledger to record and peer-validate transfer of the cryptographic digital asset to the user 404 on a transaction block. Host system 424 can also store the metadata of the digital asset, and/or the digital asset itself, which can be accessed via the address provided in the NFT. The method 500 continues to process block 524 to link the cryptographic digital asset with the unique owner ID code. This control logic may comprise executable instructions for assigning the encrypted asset code to the user 404 and storing the public and private keys in the user's digital blockchain wallet.

As shown in FIG. 5, once the digital asset has been linked to a user, as through transfer to the user of the NFT securing the digital asset, optional process block 540 may issue a digital notification, such as an email or push notification, to the user's smartphone 110, or other electronic device, with all related information for accessing, transferring, and intermingling the cryptographic digital asset. Additionally or alternatively, the remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

With continuing reference to FIG. 5, in some embodiments, after a digital asset is enabled or initialized at block 516, the method 500 can proceed to process block 528 to produce a visual representation or "digital art" of the cryptographic digital asset. The visual representation may include a computer-generated image that is generated based on attributes of the digital asset. It is also envisioned that one or more attributes of the virtual representation of the cryptographic digital asset may be created, in whole or in part, via the user 404. Alternatively, a machine learning function may be executed to generate image features through a neural network to produce the digital art at process block 528. Upon completion of the digital art, the image may be uploaded to host servers 140 at block 536, and the digital art can be included as part of the digital asset.

In some embodiments, NFTs and associated metadata can be used to validate or memorialize aspects of a transaction, including values-based metrics related to a particular transaction or a particular consumer. For example, a consumer or company may desire to purchase products that are locally sourced, or produced with sustainable materials, or are manufactured according to sustainable or fair practices, or for which the carbon generation is low. A consumer could have myriad other values for which a measurement can be made for a given transaction, and one of skill in the art would recognize that the present disclosure can be practiced for any such value. In some embodiments, then, an NFT can be minted for a given transaction and provided to a consumer, including values-based metrics for the transaction. For example, a consumer may purchase a pair of shoes made with recyclable materials and locally sourced. Upon purchasing the shoes, the consumer can receive a non-fungible token, with a digital asset describing a sustainability profile for the purchase. Recyclability can be an attribute included in the metadata of the digital asset, and another attribute can include a score for being locally sourced. In some embodiments, the attributes, including recyclability and local sourcing can be numerical, and can be calculated according to a formula. In some embodiments, the attributes can be binary values, and, for example, a shoe could be described as either locally sourced or not locally-sourced. Further, an attribute can be selected from a list of acceptable values, or some combination of the described attributes.

An NFT according to the present disclosure can be minted with immutable characteristics that cannot be updated by the issuing entity (e.g., using a globally distributed storage such as the Interplanetary File System). Alternatively, a consumer can purchase a single NFT which can include a cumulative total of sustainability scores for transactions by the user. In this regard, the attributes of the digital asset associated with the NFT can be updated upon each transaction, and the score for a given attribute for a given transaction can be added to the previous given total so that the digital asset includes a new score after each transaction. In some embodiments, entities reading or utilizing values-based scores for a given consumer can combine scores from NFTs in the consumers wallet to calculate a cumulative score for the user for a given attribute. In some embodiments, a consumer may combine (e.g., burn) separate sustainability NFTs to generate a new NFT with a digital asset having the combined attributes of the digital assets of the combined NFTs.

Sustainability NFTs, according to some embodiments can function as a "badge" for owners thereof. For example, a consumer may desire to achieve a high score on recyclability to document and telegraph their values to other individuals or to companies. Digital assets for sustainability NFTs can include images that are generated to represent the attributes of the NFT. For example, one attribute can determine a color of a portion of the image associated with the NFT, and another attribute can determine a visual element. The image can be automatically generated based on the attributes of the digital asset. A consumer can display the images associated with their NFTs in an online gallery or in the metaverse. As described above, a consumer can have multiple sustainability NFTs, each associated with a digital asset including attributes of a specific transaction, or a consumer can own a single NFT with a cumulative score representing the total of the user's score for a given attribute. In the latter case, an image of the digital asset associated with the NFT can be updated to reflect the updates to the digital asset of the NFT.

Individuals, consumers, and companies can purchase sustainability NFTs from other owners to achieve a desired score for a given attribute and can thereby encourage consumer and company behavior. For example, a first consumer who values recycling can purchase an NFT from a second consumer who performed an initial transaction that generated the NFT with a recycling attribute. Thus, a cumulative recycling score of the first user can be increased or enhanced. Where many consumers are seeking to increase a score for a given attribute, NFTs having desirable scores for that attribute can gain value, and therefore, consumers can be incentivized to make transactions that would generate an NFT with desirable attributes (e.g., recycling).

The scores of individual digital assets associated with an NFT, or cumulative scores for NFTs in a consumer's wallet can be consumed by applications or companies and can be used as input into an online application or workflow (e.g., a video game, the metaverse, online storefronts, online communities, etc.). For example, admittance to a digital event, or a given sale or portion of a game can be predicated on a given cumulative score for a consumer. An online community may, for example, require validation that a consumer achieved a certain minimum score for an attribute (e.g., locally sourced purchasing, recyclability, carbon emission scores, etc.) before admitting a consumer into the community, and the community can thus calculate the cumulative score of sustainability NFTs in the consumer's wallet before admitting the consumer. In some embodiments, certain discounts provided by a company can require that a consumer have a minimum score for a certain attribute the company may choose to prioritize. Further, admittance to events in the metaverse can require a score for a certain attribute, or a combination of scores across multiple attributes. Companies can weight multiple attributes of sustainability NFTs to produce a company-specific score for a consumer, thereby allowing for a determination of benefits to be provided to the consumer. Further, the scores for given consumers may aid companies in marketing to the given consumer. A company may thus read the digital assets associated with NFTs in a given user's wallet and can choose to market certain products to the consumer based on the cumulative scores for the consumer (which can indicate the consumer's given values).

Digital assets for sustainability NFTs can include an identification of the minting entity (e.g., the manufacturer or retailer of a product associated with the product sold). For example, multiple companies can mint sustainability NFTs, and an attribute of the digital asset associated with the sustainability NFT can include an identifier for the company. Thus, companies can accrue a cumulative score of minted NFTs which can be verified on the blockchain, and the companies can advertise a sustainability profile of the company, and associated values represented by the profile to consumers, regulators, and other companies. In some cases, some companies can require evidence of sustainable practices by another company before entering into a contractual relationship with the other company. Sustainability NFTs minted by a company can advantageously provide a method to measure the company's adherence to certain standards and entitle the company to access marketplaces, discounts, and qualify for contracts that may not otherwise be available to the company.

Figure 6:
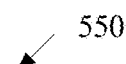
FIG. 6 depicts a flowchart for an example method of generating a digital asset including attributes associated with a transaction.
Figure 6:
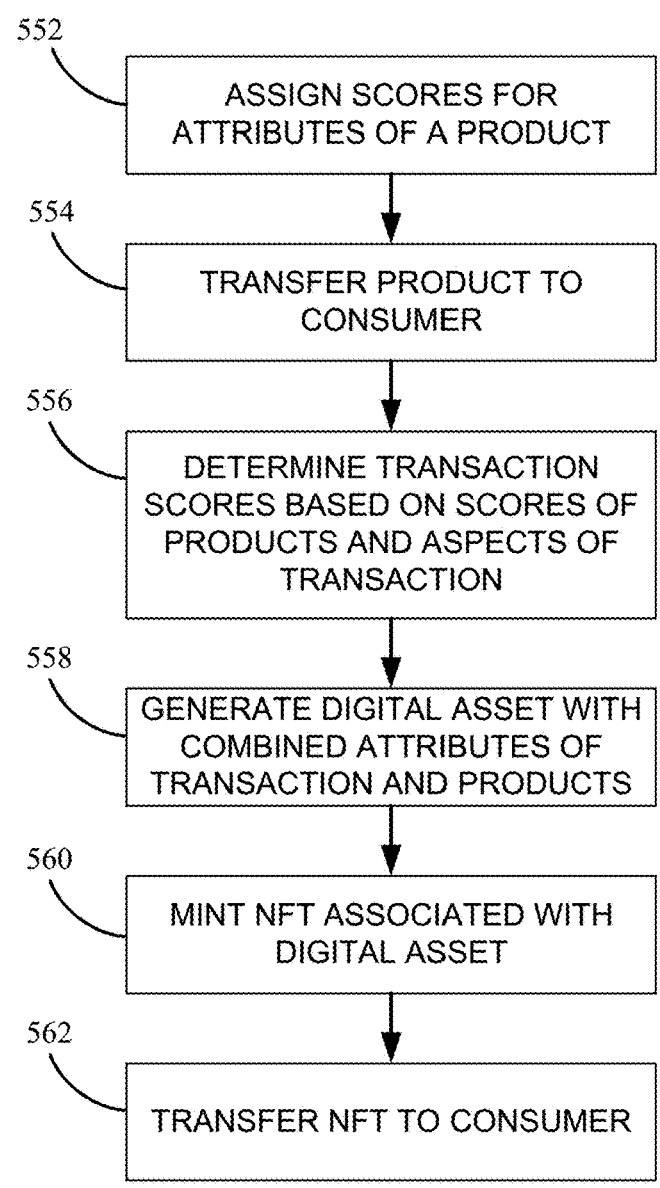

Referring now to FIG. 6, an exemplary process 550 for generation and transfer of NFTs and associated digital assets is shown. At block 552, a product is assigned scores for various attributes of the product. In some embodiments, the product can be a physical product, such as a hat, a shoe, an article of apparel, a wearable electronic device, an accessory, or a food item. In some embodiments, the product can comprise an article of sports equipment, such as, for example, a golf club, a golf bag, a golf ball, a basketball, a tennis racket, a baseball bat, or any other article of sports equipment. The product could alternatively be any article of manufacture that is capable of being sold to a consumer. Scores for the product can include metrics associated with the manufacture, transportation, or sale of the product. For example, the product can be at least partially composed of recycled materials, and a score can be assigned to the product denoting a percentage of the product that is composed of recycled material, or a net mass of recycled materials included in the product.

In some embodiments, multiple scores can be assigned to a product for multiple different attributes. For example, a product can have a score indicated an amount of carbon emissions that were generated in the manufacture and transportation of the product. Another attribute of a product could include a total distance transported for the product and component parts thereof. A score for a product could include a measurement of sustainable energy sources (e.g., wind, solar, geothermal, etc.) that were used to manufacture and transport the product. Additionally or alternatively, a score could include information about a source of the product, including, for example, a national origin for some or all of the materials of a product, or a country where the product was manufactured or assembled. In some cases, a score can be assigned representing the sustainability practices of the facilities and suppliers within the supply chain for the product. In yet another example, a score can represent a recyclability of the product or component parts thereof.

Still referring to FIG. 6, at block 554, the product can be transferred to a consumer. This can be performed at a physical location (e.g., a brick and mortar store), or the transaction can be performed remotely (e.g., online) and transferring the product to the consumer can include transporting the product. In some embodiments, at block 554, the product is not yet physically transferred to the consumer, but the consumer has completed the transaction to purchase the product. At block 556, a score can be assigned to the transaction performed at block 554. For example, the score for the transaction can include the score for the product purchased by or transferred to the consumer. In some cases, a consumer purchases multiple products in a single transaction. Thus, in some embodiments, a score for a transaction can include an aggregate score for the products purchased or transferred in the transaction. In some cases, scores for attributes of a product can be summed, and the resultant sum can be the score for that attribute of the transaction. For example, a first product may have been transported 100 miles to the location at which the transaction is occurring, and a second product may have been transported 50 miles to the location. Thus, the transaction can have a score for the attribute representing distance traveled, and the score can be the distance traveled by the first product plus the distance traveled by the second product, and the resulting score for the transaction can be 150 miles. In some embodiments, or for other attributes, combining attributes of multiple products can include performing an average, or a weighted average of attributes across multiple products. In some embodiments, attributes can be combined according to any function that can be performed across multiple scores.

Aspects of a transaction, independent of product scores, can impact attributes of a transaction. For example, at a point of sale, a consumer can choose to purchase a certain amount of carbon credit to offset the emissions produced in manufacture, storage, or transportation of the items purchased. For example, at a point of sale, a consumer can be presented with an option to offset all, or a portion of the emissions produced by the products sold in a transaction. The purchase of a carbon offset can fund environmental initiatives, such as, for example, reforestation efforts, or production of clean energy, or carbon capture, or any other process that can offset the production of carbon. Thus, if a consumer purchases a carbon offset, the total carbon emissions for the transaction can thereby be reduced, so that a carbon emissions score for the transaction can be less than a sum of carbon emission scores for products purchased in the transaction. In some cases, including in the event of an online sale, a consumer can request delivery of the product or products purchased in a transaction, and thus, a distance traveled score for the transaction can include the distance traveled by the individual products included in the transaction in addition to the distance traveled in delivery of the product. In other embodiments, other aspects of a transaction can impact one or multiple scores associated with attributes of the transaction.

At block 558, the process 550 can generate a digital asset including the scores for the transaction determined at block 556. In some embodiments, the scores can be combined in a format that is easily consumable by computer programming languages (e.g., JSON, YML, XML, HTML, etc.), and is further compliant with standards for non-fungible tokens. The digital asset can be stored on a computer system (e.g., hosted by servers 140 or 120) and can be accessible for viewing at a URL. The computer system can be controlled or operated by a selling party (e.g., a retailer or manufacturer), which can allow the selling party to modify the digital asset. For example, in some embodiments, a digital asset is not produced for each transaction between a buying party and the selling party, but instead, an existing digital asset containing cumulative scores for transactions for the buying party can be updated with scores from a transaction. Thus, a digital asset, in accordance with some aspects of this disclosure, can be mutable, and can be updated by the selling party. In some embodiments, the digital asset can be immutable, and a new digital asset can be generated for given transactions. For example, the digital asset can be hosted by third-party storage systems which can deny update access to the digital asset (e.g., the InterPlanetary File System ("IPFS")) except to mint or burn the digital asset. The third-party storage system can provide a URL or URI at which the digital asset can be accessed.

Figure 7:
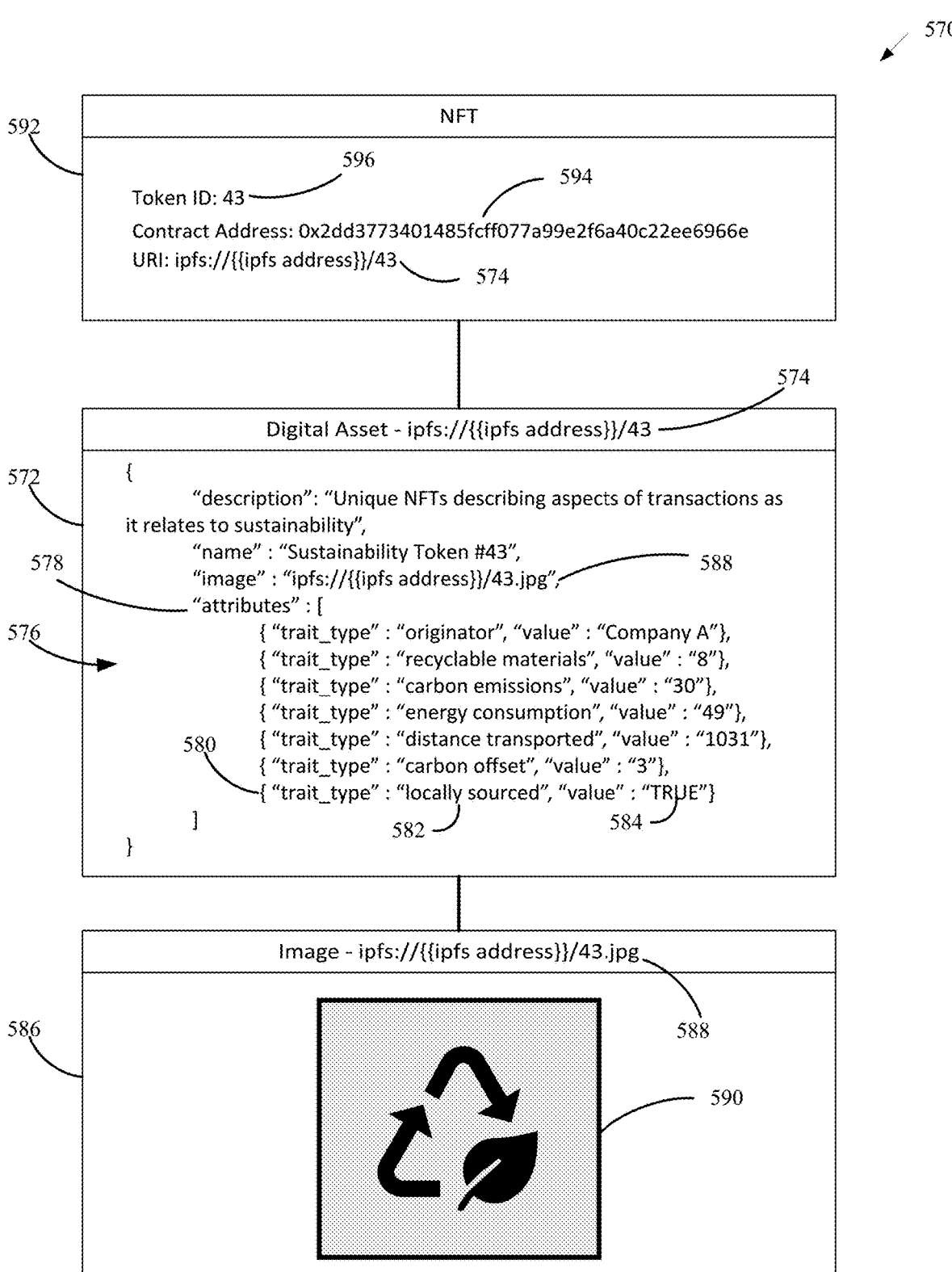
FIG. 7 depicts a schematic representation of a NFT and associated digital asset including sustainability attributes for a transaction.

Referring now to FIG. 7, an exemplary data structure 570 for a digital asset is illustrated, according to some embodiments of the present disclosure, including a digital asset 572. The digital asset 572 can have an address 574 at which the digital asset can be accessed. For example, the address 574 illustrated is an InterPlanetary File System ("IPFS") address, and the digital asset 572 is thus immutable and distributed across globally-redundant storage hosted by a third party. In some embodiments, however, an address (e.g., URL or URI) can be any web address that can be resolved by a DNS or is accessible via a web browser. The digital asset can include a json object 576, which can comprise multiple elements (e.g., a description element, a name element, etc.) in accordance with standards for digital assets associate with NFTs.

The json object 576 includes an attributes element 578, which as illustrated comprises an array of dictionaries 580, each defining an attribute 582 for the digital asset 572 and an associated value or score 584. In some cases, the value for an attribute can be a number. Some attributes, however, can be assigned a non-numerical value, which can include a Boolean (e.g., true or false) or an alphanumerical value. In some embodiments, the selling party can be included in the attributes of the digital asset 572. The illustrated digital asset 572 includes sustainability attributes for recyclable materials, carbon emissions, energy consumption, distance transported, carbon offset, and locally sourced. However, a digital asset in accordance with this disclosure can have additional metrics with associated scores, which can encompass other sustainability metrics or other measured values associated with a transaction (e.g., price, for example).

In some embodiments, the digital asset 572 can include or reference a digital image object 586. The digital image object 586 can be accessed at a web address 588, which can be included in the digital asset 572 as an element thereof (e.g., the "image" element). The digital image object 586 can include a digital image 590. The digital image 590 can be generated at least in part based on the scores for attributes of the digital asset. The digital image can be algorithmically generated according to an artificial intelligence model, and attributes of the digital asset 572 can be inputs to the model and can control visual elements of the digital image 590. As a non-limiting example, the attribute "distance traveled" could correspond to a background hue of the digital image 590, and "carbon emissions" could correspond to a transparency of portions or elements of the digital image 590. In other embodiments, all digital images associated with digital assets in accordance with this disclosure can be identical. In other embodiments, digital assets can be generated without associated digital images.

Referring back to FIG. 6, at block 560, an NFT can be minted and associated with the digital asset generated at block 558. The NFT can be generated by inputting parameters into a smart contract to generate a token on a given blockchain (e.g., Ethereum). In some embodiments, the smart contract can receive scores or attributes as inputs and can generate the digital asset (e.g., implement block 558) based on the input scores for the transaction. In some embodiments, the smart contract receives as an input the URI or URL of the digital asset and generates an NFT including the URL or URI. As illustrated in FIG. 7, an NFT 592 can include a smart contract address 594, which can be an alphanumerical string indicating the smart contract on the blockchain at which the NFT 592 was generated, and through which it can be transferred or updated. The NFT 592 can further include a token ID 596 which can uniquely identify the NFT for the given smart contract. As shown, the NFT 592 can further include the address 574 at which the digital asset 572 is hosted. In other embodiments, an NFT can include more parameters.

Referring again to FIG. 6, at block 562, the NFT can be transferred to the consumer (e.g., the purchaser of the product at block 552). Transferring the NFT can entail performing a cryptographic transaction which records a transfer of the NFT to the consumer by issuing a private key to the consumer, to be stored in a digital wallet of the user, or by associating the NFT with a private key in the consumer's wallet. Once the NFT has been transferred to the consumer's wallet, other users of the blockchain or applications integrated therewith can query the consumer's wallet, identify the sustainability NFTs owned by the consumer, and consume attributes of the digital assets associated with the NFTs owned by the consumer.

Figure 8:
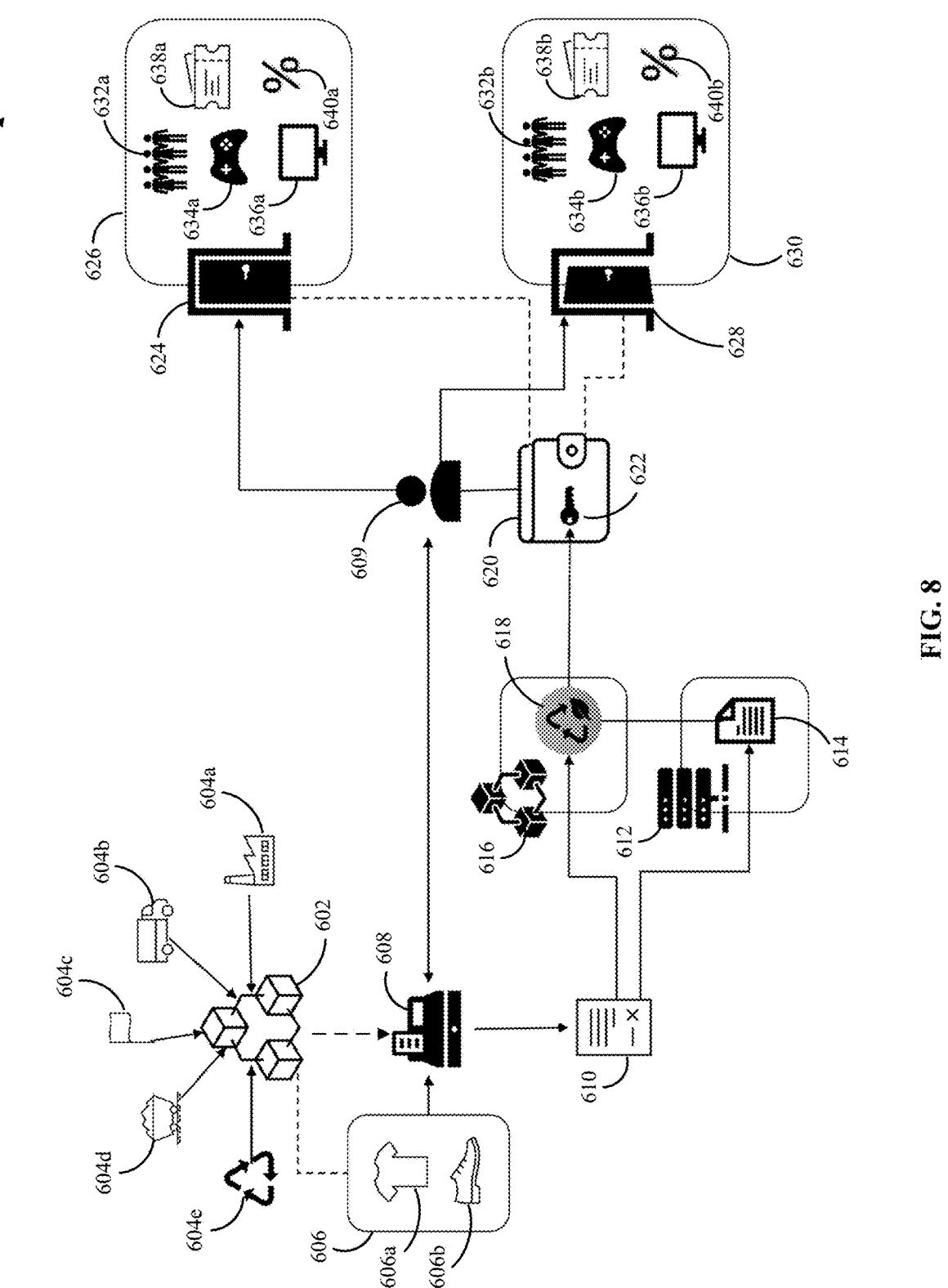
FIG. 8 depicts a schematic representation of an embodiment of a system for generating sustainability NFTs and providing benefits to a user based on sustainability NFT ownership.

Referring now to FIG. 8, an example system 600 is shown in which process 550 can be implemented. In the illustrated embodiment, a first blockchain 602 is shown in which inputs 604 can be recorded. The inputs 604 can be associated with the manufacture, transportation, and sale of products 606. For example, a manufacturing input 604*a* is illustrated, which can record to the blockchain 602 information related to the manufacturing of a product or products 606*a*, 606*b*. For example, the manufacturing input can record to the blockchain the type of energies (e.g., fossil fuel, wind, solar, geothermic, etc.) used in the manufacture of the product 606 or components thereof. Further, the manufacturing input can record a level of carbon emissions associated with production of the product 606, or an environmental rating of facilities at which the product 606 was manufactured. A transportation input 604*b* can record transport information associated with the product 606 to the blockchain 602. In some embodiments, transportation information can include a distance indicating a distance traveled for the product 606 or components thereof in the course of producing the product. Further, the transportation input 604*b* can include environmental efficiencies of the vehicles used to transport the product 606 and can further include information related to total fuel consumption and carbon production related to transportation of the product 606 or components thereof.

The blockchain 602 can further include records from source input 604*c*, which can include information about a geographic source of the materials or elements of the product 606. For example, in some cases, it may be preferable to consumers or businesses to buy locally-sourced products or products from jurisdictions with certain levels of environmental protections or commitments. Accordingly, input 604*c* can include a list of source locations for the product or elements thereof. Source input 604*c* could include a maximum distance from which elements of the product 606 are sourced from the location of sale or from the ultimate consumer. In other embodiments, source input 604*c* could record an average distance from the point of sale from which materials of the product 606 are sourced.

As another example of an input that can be recorded onto blockchain 602, a materials input 604*d* can be provided, which can input materials used in the production of product 606. The input 604*d* can record a level of energy consumption or carbon emission required to harvest the materials for product 606. Additionally, the materials input 604*d* can record an amount or percentage of certain materials present in product 606. For example, in some cases, a consumer may prefer to purchase products that are produced with minimal fossil fuel usage, or which do not contribute to deforestation, or otherwise produce perceived negative environmental impacts.

In some embodiments, recycling inputs 604*e* can also record information to the blockchain 602. Recycling inputs 604*e* can include information about the proportion of recycled materials present in product 606. Additionally or alternatively, recycling input 604*e* can record to the blockchain 602 information regarding the recyclability of the product 606. In other embodiments, additional inputs can be provided to record other parameters to a private blockchain 602 related to the manufacture, transportation, and sale of a product or products 606.

In some embodiments, the blockchain 602 can be accessible to multiple entities, and tokens thereon can be transferred between companies, manufacturers, transporters, and other participants in selling a product, or along the supply chain of a product. In some embodiments, the blockchain 602 can be utilized by multiple retailers, and can provide standardization for measurement of environmental parameters across different entities or industries. For example, use of the blockchain 602 can allow a company to aggregate environmental information including, for example, a level of carbon emissions, which can assist in helping the company to adhere to industry standards, internal policies, or governmental regulations associated therewith. In some embodiments, the blockchain 602 can provide a marketplace through which companies can buy carbon offsets to mitigate certain environmental impacts (e.g., carbon emissions). For example, some companies can engage in activities including reforestation, and can record these activities to the blockchain 602, including a negative carbon emission score resulting therefrom. Companies whose aggregate carbon emission scores place them out of compliance with given standards could purchase these tokens on the blockchain, thus reducing their aggregate carbon emission score. In other embodiments, a database can be used instead of blockchain 602, and metrics can be recorded as entries in tables of the database. In other embodiments, inputs can record information in a file storage system, or in an object storage system, or as unstructured data in a cloud storage solution.

Data from the blockchain 602 can be available at a point-of-sale system 608, so that the point-of-sale system 608 can query information about products being sold or transferred in a given transaction. In other embodiments, aggregated data for a given product 606 can be pulled from the blockchain 602 and stored in a computer system or storage system for a selling party so that the point-of-sale system 608 need not query the blockchain and perform aggregation on data obtained therefrom in the course of a given transaction. Accordingly, the point-of-sale system 608 can perform a lookup for each product 606 to obtain the desired data points for metrics associated with the product. The point-of-sale system 608 need not be a physical point of sale system (e.g., a cash register) but can include software running on remote or locally hosted computing systems. The point-of-sale system 608 can be an online point of sale or can be operative for transactions at a physical (e.g., brick and mortar) store.

As further shown in FIG. 8, a user 609 can initiate a transaction through interacting with the point-of-sale system 608. The illustrated embodiment shows a transaction wherein the user 609 is purchasing a shirt 606*a* and shoes 606*b*. It should be appreciated that a transaction can include only one product, two products, or more than two products. Additionally, the products for a given transaction can include any product and is not limited to articles of apparel and footwear. As part of the transaction, the consumer can provide information that can allow the point-of-sale system 608 to identify and interact with a digital wallet 620 owned by the consumer. In some embodiments, a process generally similar to process 500 can be executed to verify or generate the digital wallet 620 of the user 609 (i.e., as shown in blocks 502, 504, 508, 512, and 510 of FIG. 5). Upon initiation of the transaction, the point-of-sale system 608 can execute a process (e.g., process 550) for transferring the product 606 and generating and transferring an NFT associated with the transaction to the user 609. The user 609 can receive the products 606*a*, 606*b* in the course of the illustrated transaction (e.g., as shown in block 554 of process 550).

Referring still to FIG. 8, as part of a transaction in which products 606 are sold or transferred to user 609, the point-of-sale system 608 can aggregate data associated with a transaction, as described with respect to block 556 of process 550, shown in FIG. 6. In the embodiment shown, the point-of-sale system 608 aggregates the scores of attributes by combining (e.g., summing or averaging) the scores for attributes of products 606a and 606b, and further determining the scores based on aspects of the transaction.

The point-of-sale system 608 can provide the aggregated data as a payload to a smart contract 610, which can execute code to generate the digital asset 614 associated with the transaction, and further generate the NFT 618 on the blockchain 616. As shown, the digital asset 614 is hosted off of the blockchain 616 on servers 612 (e.g., similar or identical to servers 140 or 120), which can be hosted by the selling party, or could be hosted by a third-party hosting service or storage system (e.g., on a distributed storage such as IPFS). The blockchain 616 shown is a public blockchain, but in some embodiments, a private blockchain can be used in accordance with the described system. The NFT 618 can be generally similar to the NFT 592 illustrated in FIG. 7, and the digital asset 614 can be generally similar to the digital asset 572 shown in FIG. 7. The digital asset 614 can include more or fewer attributes than illustrated for digital asset 572 and can include a portion or all of the recorded metrics described with respect to inputs 604, or any metric derived therefrom. The digital asset can further include attributes not described above as inputs 604. More specifically, the attributes which can be included in a digital asset according to this disclosure are not limited to those explicitly described. One of skill in the art would recognize that a digital asset according to this disclosure can include any attributes capable of being aggregated in the manner described.

Once generated, the NFT 618 can be transferred to the consumer. As shown in FIG. 8, transferring ownership of the NFT 618 is performed by associating ownership of the NFT 618 with a private cryptographic key 622 hosted in a digital wallet 620 owned by the consumer. In some embodiments, the private key 622 can be generated along with the NFT 618 and can be transferred to the consumer's digital wallet 620. In other embodiments, the private key 622 can already reside within the digital wallet 620 and assigning ownership of the NFT 618 can comprise associating the NFT 618 with the existing key 622. Once ownership of the NFT 618 has been assigned to the digital wallet 620, transfer of the NFT 618 to another wallet, or other transactions involving the NFT 618 can require a cryptographic signature using the private key 622. Though the illustrated embodiment shows only a single NFT 618 associated with the digital wallet 620, a digital wallet for a consumer can be associated with ownership of multiple NFTs, including multiple NFTs generated in accordance with this disclosure. Thus, a digital wallet can additionally contain several cryptographic private keys, each key being associated with an individual NFT.

Ownership of NFTs in accordance with embodiments of the present disclosure can provide benefits to a consumer (e.g., user 609). In some cases, a consumer may desire to accrue sustainability NFTs to signal the consumer's commitment to a given environmental value. For example, a consumer can demonstrate a commitment to reduction of carbon emissions by owning NFTs that, in the aggregate, provide the consumer with a desirable carbon reduction score. The consumer can accrue the desired score by performing transactions as described above and purchasing products with desirable environmental attributes, or the consumer can purchase NFTs including desirable scores from another consumer who performed a transaction. In this way, consumers can incentivize desired environmental behavior as NFTs associated with digital assets indicating a desirable score for a given metric can increase in value as consumers seek to purchase those NFTs to enhance their overall scores in those given metrics. Images associated with an NFT for a transaction, as described above, can provide a visual indication of the sustainability profile of the NFT, and can be displayed in profile pictures or in online galleries or galleries in the metaverse. In some embodiments, a composite image can be generated for sustainability NFTs in a user's wallet. For example, a third-party application (e.g., a game, a virtual environment, a digital gallery, etc.) can identify sustainability NFTs in a user wallet and can perform a concatenation of attributes of the sustainability NFTs, or a subset of the sustainability NFTs. A composite visual representation can be based on the concatenated attributes and can be displayed in a digital environment (e.g., in profile pictures, in online galleries, in a gallery in the metaverse, in a video game, etc.).

Further, the selling party (e.g., the party operating the point-of-sale system 608) or a third party can provide benefits to a consumer on the basis of the consumer's aggregated scores for sustainability NFTs owned by the consumer. FIG. 8, for example, illustrates a first benefit set 626 and a second benefit set 630. FIG. 8 illustrates some non-limiting examples of benefits which can be provided to a user as part of a first benefit set 626 or the second benefit set 630. Exemplary benefits which can be provided to a user can include: membership in a club or community 632a, 632b; products or capabilities within a game 634a, 634b; access to online portals or websites 636a, 636b; discounts 638a, 638b; and tickets or admission to physical or virtual events 640a, 640b. One of skill in the art will appreciate that the number of benefit sets can vary and can include one benefit set or more than two benefit sets.

As further shown in FIG. 8, each benefit set 626, 630 is associated with a corresponding benefit threshold 624, 628. The benefit threshold 624, 628 can function as a gateway which can either allow or deny a user access to benefits in the respective benefit set based on aspects of digital assets associated with NFTs owned by the user. For example, in some cases, benefits (e.g., any or all of benefits 632a, 634a, 636a, 638a, 640a) of the benefit set 626 can be provided to users having an aggregate recyclable materials score (e.g., a given threshold sum of recyclable material scores across digital assets, an average, etc.) across digital assets owned by the user. When the user 609 attempts to access the first benefit set 626, the provider of the first benefit set can query the digital wallet 620 of the user 609 and can retrieve the digital assets 614 associated with sustainability NFTs 618 owned by the user 609. If the aggregate recyclable materials score for all digital assets 614 associated with sustainability NFTs 618 is less than the benefit threshold 624, the user 609 is denied access to the first benefit set 626 (e.g., as depicted in FIG. 8 with the closed door). Any party providing a benefit based on sustainability scores can provide a benefit set and can determine a threshold for accessing benefits of the benefit set based on any attribute or combination of attributes of digital assets associated with a sustainability NFT. Additionally, benefits (e.g., benefits 632a, 634a, 636a, 638a, 640a) can be "pushed" to a user based on the user's qualification therefor, and a user need not attempt to access the benefits for the benefits to be provided. For example, a company may scan user wallets and notify (e.g., through text message, phone call, email, social media, etc.) users meeting the benefit threshold for a given benefit set that they are qualified to receive a benefit.

As illustrated in FIG. 8, the user 609 qualifies for the benefits (e.g., any or all of benefits 632b, 634b, 636b, 638b, 640b) of the second benefit set 630, as the attributes of the digital assets 614 associated with sustainability NFTs 618 owned by the user 609 meet the second benefit threshold 628. As an example, the second benefit threshold 628 can be based on a combination of attributes of the digital assets 614. The second benefit threshold may require a threshold for locally sourced products and a threshold for total carbon offset associated with digital assets. Thus, if digital assets 614 of a user, in aggregate, have a carbon offset that exceeds the carbon offset threshold, and a locally sourced attribute for the digital asset 614 indicates that products 606 associated with the transaction generating the digital asset 614 were locally sourced, the user 609 satisfies the second benefit threshold 628, and the user 609 can be granted access to benefits of the second benefit set 630. Conversely, if digital assets of a user, in the aggregate, have a carbon offset that exceeds the carbon offset threshold, but the digital assets indicate that the associated products were not locally sourced, the user can be denied access to benefits of the second benefit set. Further, a provider of benefits can define a threshold according to any attribute or combination of attributes of digital assets associated with sustainability NFTs, which can include individual thresholds for attributes of the digital assets, an equation in which the attributes are variables which can be mathematically combined to produce a score, etc.

In some cases, providing a user access to benefits (e.g., benefits of the second benefit set 630) can include providing the user with a "digital ticket." A digital ticket can be any digital indication, readable by one or more computer systems to indicate that the user is entitled to one or more benefits. In some examples, the digital ticket can be an attribute of an account of the user in one or more digital systems, and the system providing the benefits can query the attribute of the user's account to determine if the user is, in fact, entitled to receive a benefit. In some cases, the digital ticket can be issued to the user through a communication means (e.g., through a text message, a message on a social media platform, through email, through a notification on an app, etc.). The message comprising the digital ticket can include a link to access the entitlement, or a code to be entered at one or more digital systems to receive the entitlement. Further, the digital ticket can be a benefit NFT that is issued to the user, and digital systems providing the benefit can query a wallet of the user, and, upon identification of the benefit NFT, provide the benefit to the user. In some cases, the digital ticket can include a visual output to the user (e.g., a quick-response code ("QR code"), a bar code, or other visual output) that can be provided by the user to an individual or digital system to prove the user's entitlement to a benefit. In other examples, digital tickets can be any digital indication readable by another computer, application, or digital system to prove the user's entitlement to a benefit.

Figure 9:
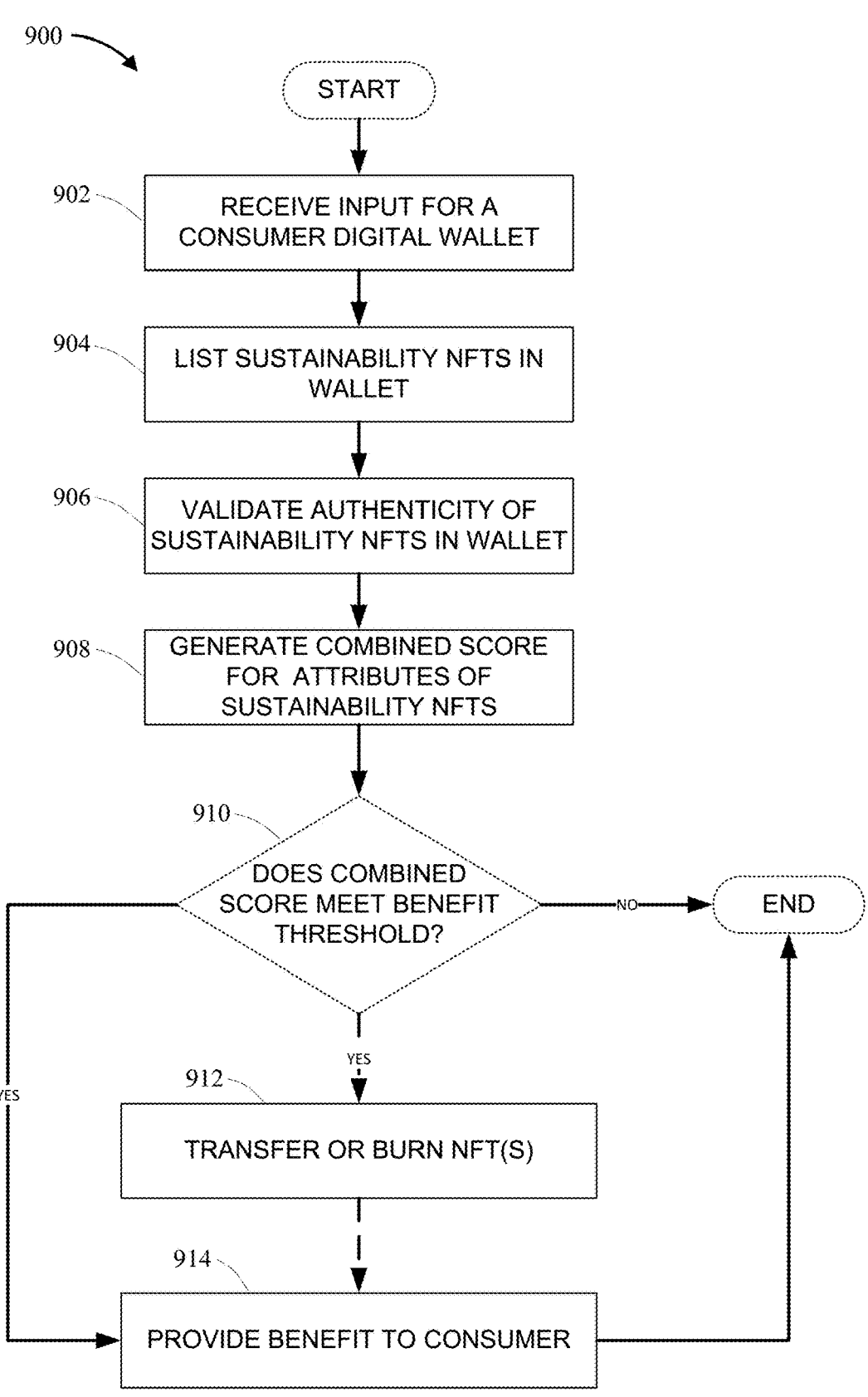
FIG. 9 depicts a flowchart for an example method of providing a benefit to an owner of sustainability NFTs.

Now referring to FIG. 9, an exemplary process 900 is shown for providing benefits based on sustainability NFTs and digital assets associated therewith. In some embodiments, the process 900 can be executed on a computing device or server similar to servers 120, 140. At block 902, input for a consumer digital wallet (e.g., digital wallet 620 shown in FIG. 8) is received. In some embodiments, the input includes identifying information for the digital wallet which can allow a computing device to query aspects of the digital wallet and NFTs owned thereof. In some embodiments, the input is provided by a subject associated with the digital wallet (e.g., an owner of the digital wallet). In some embodiments, the input is received from another source, including from a list of digital wallets, a third-party system, a database of digital wallets, etc.

At block 904, the process 900 can list sustainability NFTs in the consumer digital wallet. Listing sustainability NFTs can include listing all NFTs in the wallet and identifying sustainability NFTs based on an attribute of the NFT. As part of listing the sustainability NFTs, the method can further query digital assets associated with the NFTs to read information provided in the digital assets. At block 906, the authenticity of the sustainability NFTs is validated. This can comprise verification that an originator of the NFTs is an approved originator, or that an NFT was minted using an approved smart contract. In some embodiments, verifying the authenticity can comprise filtering sustainability NFTs to identify NFTs originated by a certain company (e.g., a retailer). For example, a retailer may desire to provide a benefit based only on NFTs associated with transactions performed at that retailer.

At block 908, the attributes of digital assets associated with the authenticated NFTs can be used to generate a combined score for the subject associated with the digital wallet. In some examples, the score can be a sum of the values associated with an attribute of the digital assets. For example, a total distance transported can be calculated as a combined scored by summing a "distance transported" attribute of all digital assets associated with sustainability NFTs in a digital wallet. In some examples, the combined score can be an average. For example, a "recyclable materials" attribute can indicate a percentage of products associated with a transaction that are composed of recyclable materials, and the percentages for each recyclable materials attribute of digital assets can comprise an aggregate average of a percentage of recyclable materials associated with all transactions represented by sustainability NFTs in the digital wallet. In some embodiments, the combined score can be determined or calculated based on a mathematical combination of one or more attributes of digital assets associated with sustainability NFTs in a user's wallet, and the formula for generating the combined score can be assigned by a company or entity providing a benefit.

At block 910, the process 900 can determine whether a combined score, as determined at block 908, meets a benefit threshold. In some embodiments, meeting a benefit threshold signifies that the combined score is greater than the benefit threshold. In other embodiments, the threshold benefit is met (thus qualifying for a benefit) when a combined score for a user is beneath a threshold. For example, digital assets of sustainability NFTs can include a "carbon emissions" attribute, and a benefit can be conditioned on a cumulative carbon emissions score of the user being lower than a given threshold. If the benefit threshold is not met, the process 900 completes, and the subject associated with the digital wallet is not provided a benefit.

Still referring to FIG. 9, at block 912, upon determination that the combined score meets the benefit threshold, a benefit can be provided to the subject associated with the digital wallet. The benefit can include any or all of the benefits described with respect to FIG. 8, or any other benefit that can be provided to a consumer. In some embodiments, provision of the benefit requires that the subject associated with the digital wallet surrender ownership of one or more NFTs. For example, at block 912, NFTs of the user can be transferred to the entity providing the benefit or could alternately be burned before the user is provided the benefit at block 914. NFTs to be burned or transferred can be selected on the basis of the NFTs or combination of NFTs for which attributes of associated digital assets meet the benefit threshold. A company, for example, may desire to acquire NFTs to achieve a combined score for the company (e.g., a total carbon offset, a desirable portfolio of recycled or recyclable materials, etc.). Once the benefit has been provided to the subject associated with the digital wallet, the process 900 can complete.

Figure 10:
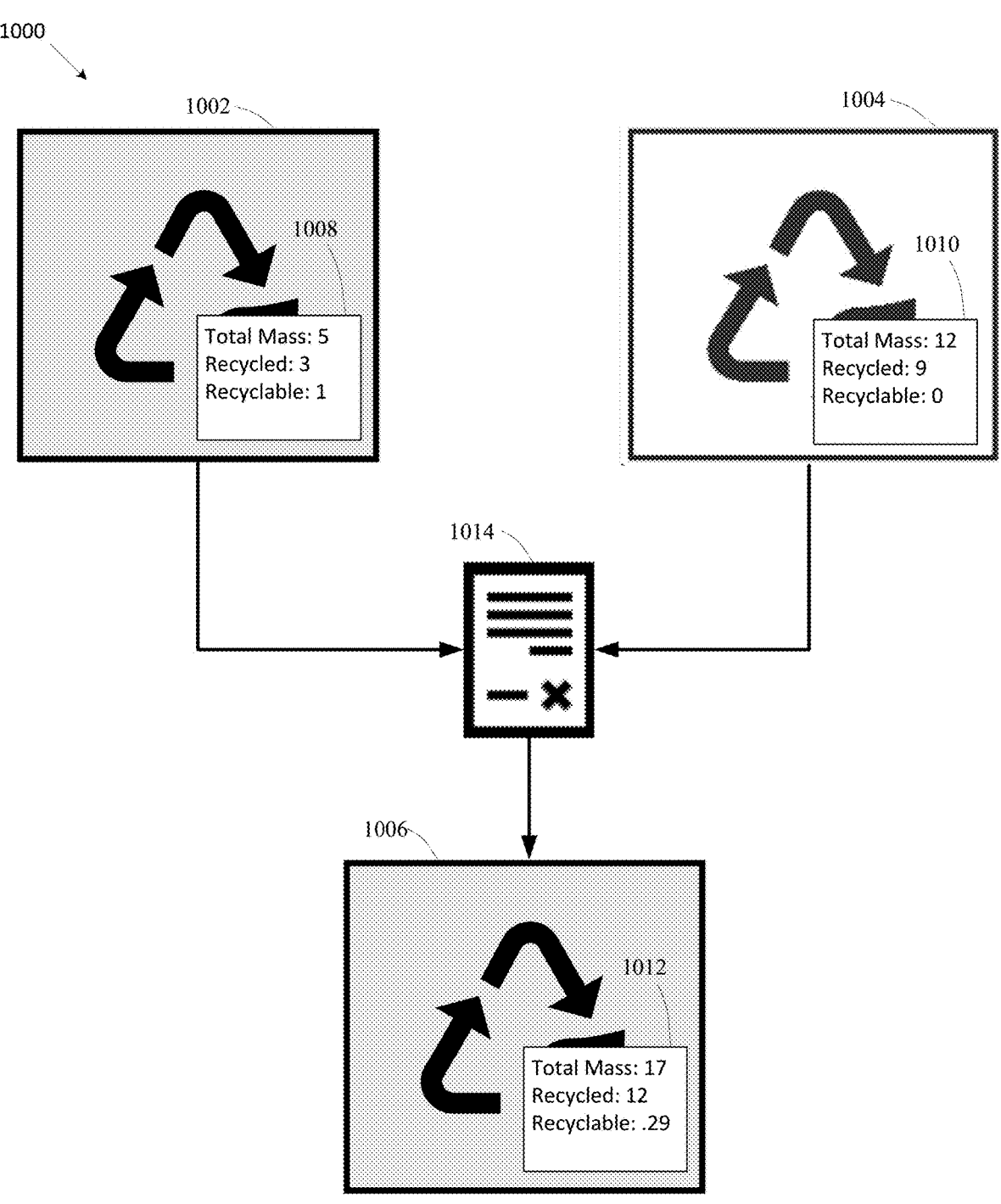
FIG. 10 depicts a schematic representation of a breeding process for breeding two sustainability NFTs, according to some embodiments disclosed herein.

In some cases, parent sustainability NFTs can be combined to generate a single child sustainability NFT, and a digital asset associated with the child sustainability NFT can include a combination of the attributes of the digital assets associated with the parent sustainability NFTs. For example, FIG. 10 illustrated an example of a breeding process in which a first parent sustainability NFT 1002 and a second parent sustainability NFT 1004 are bred to produce a child sustainability NFT 1006. The first parent sustainability NFT 1002 is associated with a first digital asset 1008, the second parent sustainability NFT 1004 is associated with a second digital asset 1010, and the child sustainability NFT 1006 is associated with a third digital asset 1012. In the illustrated embodiment, each of the digital assets 1008, 1010, 1012 include three attributes: "total mass," "recycled," and "recyclable." In other embodiments, sustainability NFTs used in breeding can have any number of attributes. Further, in other embodiments, more than two parent sustainability NFTs can be combined or bred to produce a child NFT. In some embodiments, a breeding operation can preserve a cumulative total for sustainability attributes. For example, parent NFTs can be burned to breed a child NFT.

Smart contracts can be provided to govern the terms of breeding operations for sustainability NFTs. For example, as shown in FIG. 10, the parent sustainability NFTs 1002, 1004 are provided to a smart contract 1014 to produce the child sustainability NFT 1006. The smart contract 1014 can define rules for combining NFTs, and for aggregating attributes of digital assets associated therewith. For example, as shown, the value for the "recycled" attribute of the digital asset 1012 associated with the child sustainability NFT 1006 can be a simple sum of the "recycled" attributes of the digital assets 1008, 1010 associated with the parent sustainability NFTs 1002, 1004. The smart contract 1014 can define different rules for calculating the values for attributes of the digital asset 1012 of the child sustainability NFT 1006. For example, the "recyclable" field illustrated for digital assets 1008, 1010, and 1012 can indicate a proportion of the products sold in the transaction generating the digital asset that were recycled. Accordingly, for digital asset 1008, the value of "1" for the "recyclable" attribute can indicate that associated products were comprised entirely of recyclable materials, while the value "0" of the "recyclable" attribute of the digital asset 1010 can indicate that the associated products are not recyclable. Thus, the "recyclable" attribute of the digital asset 1012 associated with the child sustainability NFT 1006 can indicate a proportion of the total mass of products associated with parent sustainability NFTs 1002, 1004 that is recyclable (e.g., 29). In other embodiments, values of attributes of digital assets associated with parent sustainability NFTs can be combined according to any rules defined in a smart contract.

In some embodiments, a visual representation associated with the child NFT 1006 can comprise an image generated based on attributes of the child NFT 1006 (e.g., as described with respect to block 516 shown in FIG. 5). In some embodiments, a visual representation of the child NFT 1006 can include visual elements from the two or more parent NFTs 1002, 1004. For example, a visual representation of a child NFT (e.g., child NFT 1006) can include a background from a visual representation of a first parent NFT and a symbol from a visual representation of a second NFT. In some embodiments, before a user breeds parent NFTs 1002,

1004, a visual representation of a prospective child NFT can be generated and visually displayed to the user, and the user could thus decide to proceed with breeding the parents or decline to breed the parents in part based on the generated visual representation of the prospective child NFT.

The above-described aspects of the processes of FIGS. 5, 6, and 9 can be executed or performed in any order or sequence not limited to the order and sequence shown and described in the figures. Also, some of the above aspects of the processes of FIGS. 5, 6, and 9 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of managing digital assets, comprising:
   receiving an input identifying a first digital wallet;
   identifying one or more non-fungible tokens associated with the first digital wallet;
   selecting, from the one or more non-fungible tokens, one or more sustainability tokens, each of the one or more sustainability tokens being associated with a corresponding sustainability digital asset;
   for each of the one or more sustainability tokens:
      retrieving, from a distributed blockchain ledger, a uniform resource indicator for the corresponding sustainability digital asset, and
      retrieving, based on the uniform resource indicator, one or more attributes of the corresponding sustainability digital asset;
   generating a composite sustainability score based on the one or more attributes of the sustainability digital assets associated with the one or more sustainability tokens;
   comparing the composite sustainability score to a first benefit criterion;
   in response to determining that the composite sustainability score meets the benefit criteria, providing a first benefit to an owner of the first digital wallet;
   updating an attribute of a sustainability digital asset corresponding to at least one of the one or more sustainability tokens, responsive to a determination that the composite sustainability score meets the benefit criteria; and
   automatically generating a private key upon scanning a first physical product,
   wherein a public key and a private key are provided to a purchasing party after a first transaction,
   wherein the public key is provided by a host system to validate a transfer of a cryptographic digital asset and the private key links the cryptographic digital asset to the first digital wallet after the first transaction, and
   wherein the private key indicates to a validated owner where the cryptographic digital asset is located in a blockchain network and how to decrypt a proprietary asset file.

2. The method of claim 1, wherein the attributes of the sustainability digital asset corresponding to a first sustainability token include at least a first sustainability attribute of the first physical product.

3. The method of claim 2, wherein the first sustainability attribute is indicative of a volume of carbon emissions associated with the manufacture and transportation of the first physical product, and wherein the composite sustainability score is based at least in part on the first sustainability attribute.

4. The method of claim 1, wherein the attributes of at least one of the one or more sustainability digital assets include a recycling attribute, the recycling attribute associated with a proportion of recyclable materials of one or more physical products associated with the at least one sustainability digital asset, and wherein the composite sustainability score is based at least in part on the recycling attribute.

5. The method of claim 4, wherein the first benefit criteria is a minimum recyclability criteria indicating a minimum proportion of recyclable materials.

6. The method of claim 1, wherein the first benefit is admission to a physical event.

7. The method of claim 1, wherein the composite sustainability score is based at least in part on the attributes of a second sustainability digital asset corresponding to a second sustainability token, and wherein the method further includes recording to the distributed blockchain ledger, responsive to a determination that the composite sustainability score meets the benefit criteria, an updated status of the second sustainability token.

8. The method of claim 7, wherein the updated status of the second sustainability token includes a transfer of the second sustainability token.

9. The method of claim 7, wherein the updated status includes a permanent removal of the second sustainability token from the distributed blockchain ledger.

10. The method of claim 1 further comprising the steps of: generating a second composite sustainability score based on the one or more attributes of the sustainability digital assets associated with the one or more sustainability tokens; and comparing the second composite sustainability score to a second benefit criteria; and providing a second benefit to an owner of the first digital wallet when the second composite sustainability score meets the second benefit criteria.

11. The method of claim 1, wherein the one or more attributes include a first sustainability attribute and a second sustainability attribute, and wherein the composite sustainability score is at least partially based on each of the first sustainability attribute and the second sustainability attribute.

12. A system comprising: a computer including a at least one processor, the processor configured to:
receive an input identifying a first digital wallet;
identify one or more non-fungible tokens associated with the first digital wallet;
select, from the one or more non-fungible tokens, one or more sustainability tokens, each of the one or more sustainability tokens being associated with a corresponding sustainability digital asset, and for each of the one or more sustainability tokens:
retrieve, from a distributed blockchain ledger, a uniform resource indicator for the corresponding sustainability digital asset, and retrieve, based on the uniform resource indicator, one or more attributes of the corresponding sustainability digital asset;
generate a composite sustainability score based on the one or more attributes of the sustainability digital assets associated with the one or more sustainability tokens;
compare the composite sustainability score to a first benefit criterion;
provide, to a subject associated with the first digital wallet, an entitlement to a first benefit in response to determining that the composite sustainability score meets the benefit criteria;
updating an attribute of a sustainability digital asset corresponding to at least one of the one or more sustainability tokens, responsive to a determination that the composite sustainability score meets the benefit criteria; and
automatically generating a private key upon scanning a first physical product,
wherein at least a first sustainability token of the one or more sustainability tokens corresponds to the first physical product,
wherein the first sustainability token is associated with a first transaction, the first transaction including a transfer to a first purchasing party of the first physical product,
wherein the attributes of the first sustainability token include sustainability attributes of a second physical product transferred to the first purchasing party in the first transaction,
wherein a public key and the private key are provided to the first purchasing party after the first transaction,
wherein the public key is provided by a host system to validate the transfer of a cryptographic digital asset and the private key links the cryptographic digital asset to the first digital wallet after the first transaction, and
wherein the private key indicates to a validated owner where the cryptographic digital asset is located in a blockchain network and how to decrypt a proprietary asset file.

13. The system of claim 12, wherein the entitlement includes a digital ticket.

14. The system of claim 13, wherein the processor is further configured to output, to a display, the digital ticket.

15. The system of claim 13, wherein providing the entitlement to the first benefit to the subject associated with the first digital wallet includes: generating a digital asset corresponding to the entitlement; transmitting, to a server associated with a distributed blockchain ledger, an instruction to generate a token corresponding to the digital asset; and transmitting, to the server an instruction to transfer the token to the first digital wallet.

16. The system of claim 12, wherein the composite sustainability score is partially based on a sum of at least one sustainability attribute of the first physical product and at least one sustainability attribute of the second physical product.

* * * * *